United States Patent
Nakane et al.

(10) Patent No.: US 11,005,318 B2
(45) Date of Patent: May 11, 2021

(54) ROTOR FOR ROTARY ELECTRIC MACHINE AND VEHICLE DRIVE DEVICE INCLUDING THE ROTOR FOR ROTARY ELECTRIC MACHINE

(71) Applicants: AISIN AW CO., LTD., Anjo (JP); TOYOTA JIDOSHA KABUSHIKI KAISHA, Toyota (JP)

(72) Inventors: Hiroki Nakane, Kariya (JP); Takefumi Komaki, Okazaki (JP); Masayuki Ikemoto, Anjo (JP); Yoshinari Nakagawa, Nishio (JP); Minoru Anai, Toyota (JP); Shinya Sano, Toyota (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 145 days.

(21) Appl. No.: 16/529,250

(22) Filed: Aug. 1, 2019

(65) Prior Publication Data
US 2020/0052534 A1    Feb. 13, 2020

(30) Foreign Application Priority Data

Aug. 8, 2018   (JP) .............................. JP2018-149317
May 21, 2019   (JP) .............................. JP2019-095360

(51) Int. Cl.
*H02K 1/27*   (2006.01)
*H02K 9/19*   (2006.01)

(52) U.S. Cl.
CPC ................. *H02K 1/27* (2013.01); *H02K 9/19* (2013.01)

(58) Field of Classification Search
CPC .. H02K 1/27; H02K 9/19; H02K 1/32; H02K 21/14; H02K 2213/03; H02K 7/006

USPC ..................................................... 310/156.01
See application file for complete search history.

(56) References Cited

U.S. PATENT DOCUMENTS

| | | | | |
|---|---|---|---|---|
| 4,884,955 A | * | 12/1989 | Richardson, Jr. ... | F04C 18/0215 418/1 |
| 5,263,906 A | * | 11/1993 | Antonov .................. | F16D 13/74 475/257 |
| 2013/0038151 A1 | * | 2/2013 | Ohashi .................. | H02K 5/1737 310/59 |
| 2014/0077631 A1 | * | 3/2014 | Watanabe .............. | H02K 9/193 310/54 |
| 2014/0126606 A1 | * | 5/2014 | Ito .......................... | G01K 7/427 374/163 |
| 2014/0126607 A1 | * | 5/2014 | Oya ........................ | G01K 7/427 374/163 |
| 2016/0290480 A1 | * | 10/2016 | Sada .................... | F16H 57/0447 |

FOREIGN PATENT DOCUMENTS

JP   2014-239627 A   12/2014

* cited by examiner

*Primary Examiner* — Alex W Mok
(74) *Attorney, Agent, or Firm* — Oliff PLC

(57) ABSTRACT

A rotor for a rotary electric machine, the rotor including: a rotor core; a rotor shaft having a tubular shape, passing through a radially inner side of the rotor core to be coupled to the rotor core, and extending along an axial direction; an oil supply path that supplies oil to the rotor shaft, a portion to be lubricated that is disposed on a first axial side with respect to the rotor core, wherein one side in the axial direction is defined as the first axial side and another side in the axial direction is defined as a second axial side; and a lubrication oil path through which oil is supplied to the portion to be lubricated.

16 Claims, 9 Drawing Sheets

ROTOR FOR ROTARY ELECTRIC MACHINE AND VEHICLE DRIVE DEVICE INCLUDING THE ROTOR FOR ROTARY ELECTRIC MACHINE

INCORPORATION BY REFERENCE

The disclosure of Japanese Patent Application No. 2018-149317 filed on Aug. 8, 2018 and No. 2019-095360 filed on May 21, 2019 including the specification, drawings and abstract is incorporated herein by reference in its entirety.

BACKGROUND

The present disclosure relates to a rotor for a rotary electric machine and a vehicle drive device that includes the rotor for a rotary electric machine.

There is a known structure in which an inner peripheral portion formed on the radially inner side of a tubular rotor shaft that passes through a rotor of a rotary electric machine is utilized as an oil path for supplying oil to lead oil from the inner peripheral portion to a rotor core via radial oil paths that extend along the radial direction. For example, Japanese Patent Application Publication No. 2014-239627 (JP 2014-239627 A) discloses a rotor (2) for a rotary electric machine, which includes an inner peripheral portion (90) formed on the radially inner side of a tubular rotor shaft (3) and radial oil paths (91) that pass through the inner peripheral portion (90) and the outer peripheral surface of the rotor shaft (3) along the radial direction (R) to communicate with a rotor core (10) (see FIG. 2 etc.; the reference numerals in the parentheses in the Description of the Related Art section are those used in the cited document). Oil supplied to the inner peripheral portion (90) flows through the radial oil paths (91) because of a centrifugal force due to rotation of the rotor shaft (3) to be supplied to the rotor core (10). The oil supplied to the rotor core (10) cools permanent magnets (5) embedded in the rotor core (10) through heat exchange with the rotor core (10).

SUMMARY

In order to lead an amount of oil enough to cool the permanent magnets (5) from the inner peripheral portion (90) to the rotor core (10) via the radial oil paths (91), it is conceivable to reserve oil in the inner peripheral portion (90) by providing a weir portion that dams oil in the inner peripheral portion (90), for example. However, oil in the inner peripheral portion (90) is not only utilized to cool the permanent magnets (5), but also utilized to lubricate a portion to be lubricated. For example, oil in the inner peripheral portion (90) occasionally flows along the axial direction (L) in the inner peripheral portion (90) to be used as lubricating oil for a bearing that supports the rotor shaft (3) at an end portion thereof in the axial direction (L). In such a case, if a weir portion is provided in the inner peripheral portion (90) to limit the flow of oil along the axial direction (L), oil may not flow to the bearing as the portion to be lubricated, and the portion to be lubricated may not be lubricated sufficiently.

In view of the foregoing circumstance, it is desirable to provide a rotor for a rotary electric machine that can both cool a rotor core disposed on the radially outer side of a rotor shaft and lubricate a portion to be lubricated appropriately, and to provide a vehicle drive device that includes the rotor for a rotary electric machine.

In view of the foregoing, an aspect of the present disclosure provides a rotor for a rotary electric machine, the rotor including: a rotor core; a rotor shaft having a tubular shape, passing through a radially inner side of the rotor core to be coupled to the rotor core, and extending along an axial direction; an oil supply path that supplies oil to the rotor shaft, a portion to be lubricated that is disposed on a first axial side with respect to the rotor core, wherein one side in the axial direction is defined as the first axial side and another side in the axial direction is defined as a second axial side; and a lubrication oil path through which oil is supplied to the portion to be lubricated, wherein: the rotor shaft includes: an inner peripheral portion surrounded by an inner peripheral surface of the tubular shape, a radial oil path that has an opening that opens in the inner peripheral surface and that extends along a radial direction, an annular weir disposed on the first axial side with respect to the opening and disposed so as to project radially inward from the inner peripheral surface and extend in a circumferential direction along the inner peripheral surface, and an axial communication path; the oil supply path supplies oil to a portion of the inner peripheral portion on the second axial side with respect to the weir; the lubrication oil path is disposed on the first axial side with respect to the weir; and the axial communication path is provided in the inner peripheral surface or the weir to communicate between a portion of the inner peripheral portion on the first axial side with respect to the weir and the portion of the inner peripheral portion on the second axial side with respect to the weir and communicate with the lubrication oil path.

With the present configuration, oil supplied to the inner peripheral portion of the rotor shaft can be kept in the inner peripheral portion by the weir. Therefore, it is possible to appropriately supply oil to the radial oil path via the opening which opens in the inner peripheral surface of the rotor shaft, and to appropriately cool the rotor core which is disposed on the radially outer side of the rotor shaft. With the present configuration, in addition, oil can be supplied from a region of the inner peripheral portion on the second axial side with respect to the weir to the lubrication oil path on the first axial side with respect to the weir through the axial communication path which communicates between the portion of the inner peripheral portion on the first axial side with respect to the weir and the portion thereof on the second axial side with respect to the weir. Thus, it is possible to appropriately supply oil also to the portion to be lubricated which is disposed on the first axial side with respect to the rotor core, and to appropriately lubricate the portion to be lubricated.

Further features and advantages of the technology according to the present disclosure will become apparent from the following description of exemplary and non-limiting embodiments made with reference to the drawings.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

1. First Embodiment

Figure 1:
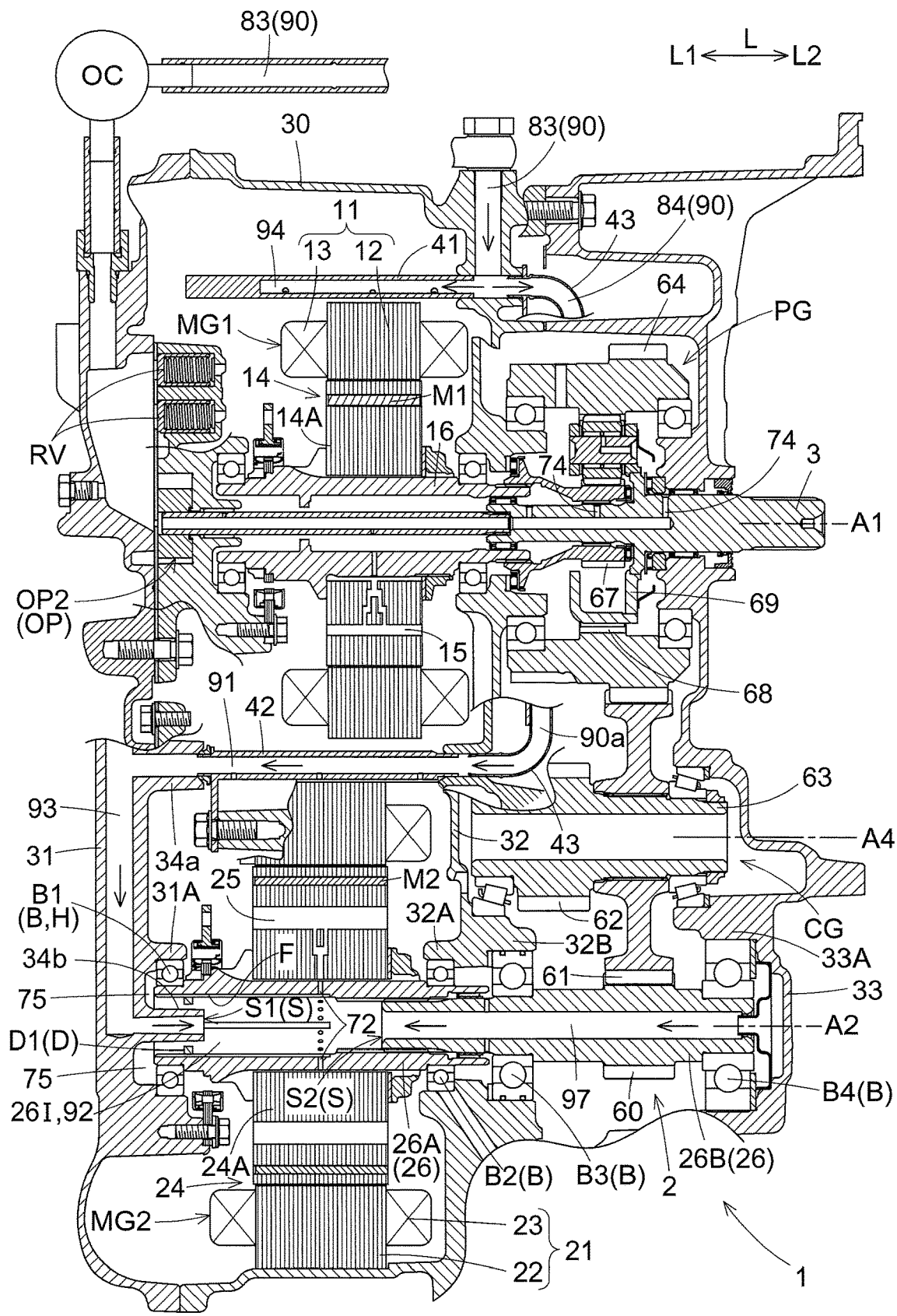
FIG. 1 is a sectional view of a vehicle drive device according to an embodiment.

A rotor for a rotary electric machine according to a first embodiment will be described with reference to an example in which the rotor for a rotary electric machine is applied to a vehicle drive device. In the following embodiment, a second rotor 24 of a second rotary electric machine MG2 functions as the "rotor for a rotary electric machine". Thus, in the following, a second rotor core 24A functions as the "rotor core", and a second rotor shaft 26 functions as the "rotor shaft".

In the following description, a vertical direction V (see FIG. 4) means the vertical direction with the rotary electric machine in the use state, that is, the vertical direction for a case where the rotary electric machine is directed in the use state. In the present embodiment, the rotary electric machine is provided in a vehicle drive device. Therefore, the vertical direction V coincides with the vertical direction with the vehicle drive device mounted on a vehicle. The "upper side" and the "lower side" mean the upper side and the lower side, respectively, in the vertical direction V. In the following description, directions for each member indicate directions with that member assembled to the device (the vehicle drive device in the present embodiment) in which the rotary electric machine is provided. Terms related to the dimensions, arrangement directions, arrangement positions, etc. of each member may allow a difference due to an error (an allowable manufacturing error).

The term "drivably coupled" as used herein means a state in which two rotary elements are coupled to each other in such a manner that enables transfer of a drive force (a synonym for torque). This concept includes a state in which the two rotary elements are coupled so as to rotate together with each other, and a state in which the two rotary elements are coupled via one or more transmission members in such a manner that enables transfer of a drive force. Such transmission members may include various members (such as a shaft, a gear mechanism, a belt, and a chain) that transfer rotation at an equal speed or a changed speed, and include engagement devices (such as a friction engagement device and a meshing engagement device) that selectively transfer rotation and a drive force. In the case where rotary elements of a planetary gear mechanism are "drivably coupled" to each other, however, it is intended that three rotary elements of the planetary gear mechanism are drivably coupled to each other via no other rotary element.

The term "rotary electric machine" as used herein refers to any of a motor (electric motor), a generator (electric generator), and a motor generator that functions both as a motor and as a generator as necessary. With regard to the arrangement of two members, the phrase "overlap each other as viewed in a specific direction" as used herein means that when an imaginary line that is parallel to the viewing direction is moved in directions that are orthogonal to the imaginary line, the imaginary line crosses both of the two members in at least some region.

[Schematic Configuration of Vehicle Drive Device]

Figure 3:
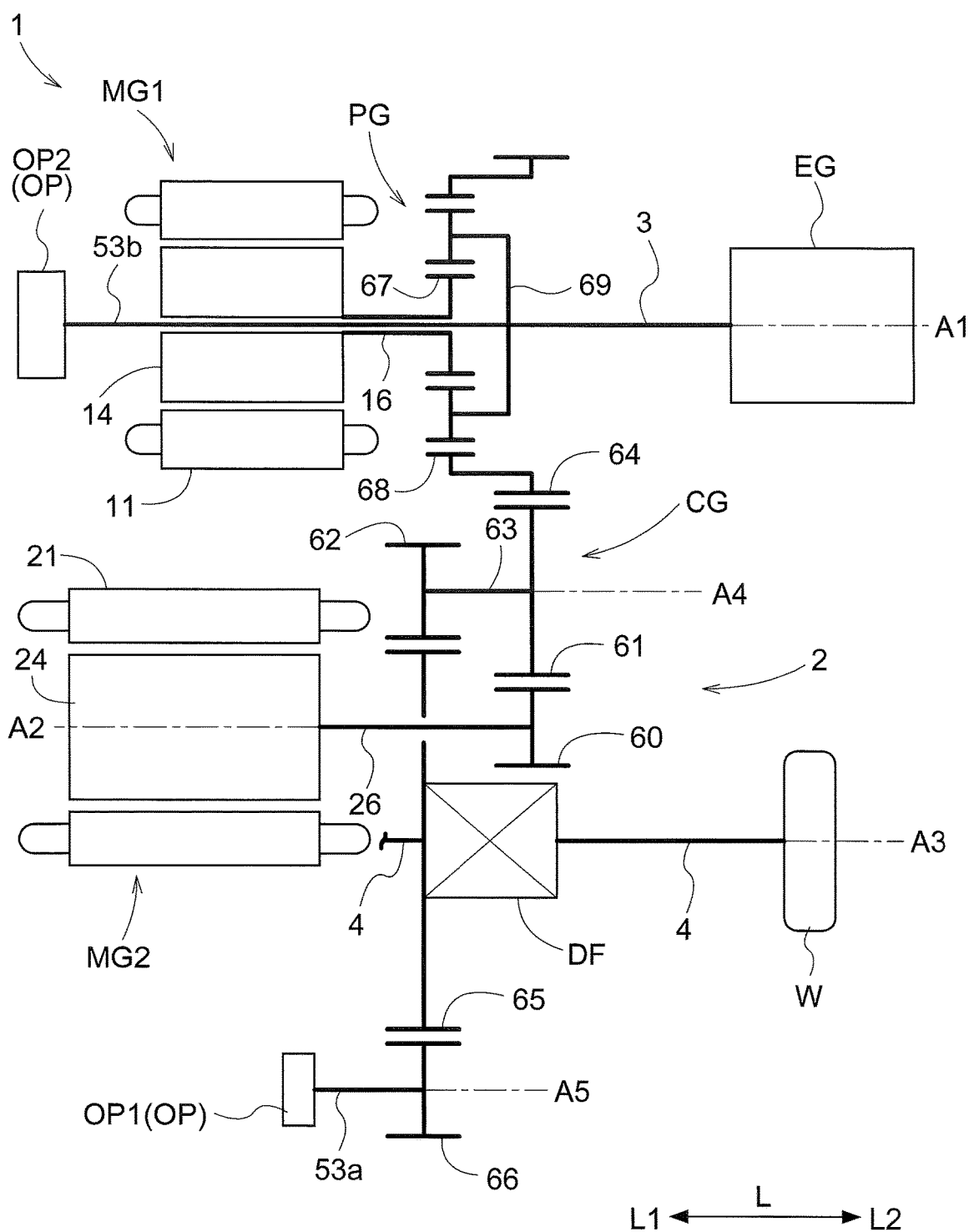
FIG. 3 is a skeleton diagram of the vehicle drive device according to the embodiment.

A schematic configuration of a vehicle drive device 1 will be described. The vehicle drive device 1 is a device that transfers a drive force of a drive force source (drive force source for wheels W) to an output member 4 drivably coupled to the wheels W to cause the vehicle to travel. The vehicle drive device 1 includes rotary electric machines (here, a first rotary electric machine MG1 and the second rotary electric machine MG2) as drive force sources for the wheels W. In the present embodiment, as illustrated in FIG. 3, the vehicle drive device 1 includes an input member 3 drivably coupled to an internal combustion engine EG that serves as a drive force source for the wheels W. That is, the vehicle drive device 1 is a drive device (hybrid vehicle drive device) that drives a vehicle (hybrid vehicle) that includes both the internal combustion engine EG and the rotary electric machines (MG1 and MG2). Specifically, the vehicle drive device 1 is a hybrid vehicle drive device of a so-called two-motor split type. The internal combustion engine EG is a motor (such as a gasoline engine or a diesel engine) driven by combusting fuel inside the engine to take out power.

The vehicle drive device 1 includes the first rotary electric machine MG1 and the second rotary electric machine MG2. In the present embodiment, as illustrated in FIG. 1, the first rotary electric machine MG1 and the second rotary electric machine MG2 are housed in a case 30. The case 30 also houses other devices and mechanisms of the vehicle drive device 1. In the present embodiment, as illustrated in FIG. 3, the vehicle drive device 1 includes the input member 3, the output member 4, a planetary gear mechanism PG a counter gear mechanism CG, an output differential gear device DF, a first oil pump OP1, and a second oil pump OP2, in addition to the first rotary electric machine MG1 and the second rotary electric machine MG2. The input member 3, the output member 4, the planetary gear mechanism PG the counter gear mechanism CG, the output differential gear device DF, the first oil pump OP1, and the second oil pump OP2 are also housed in the case 30.

Figure 4:
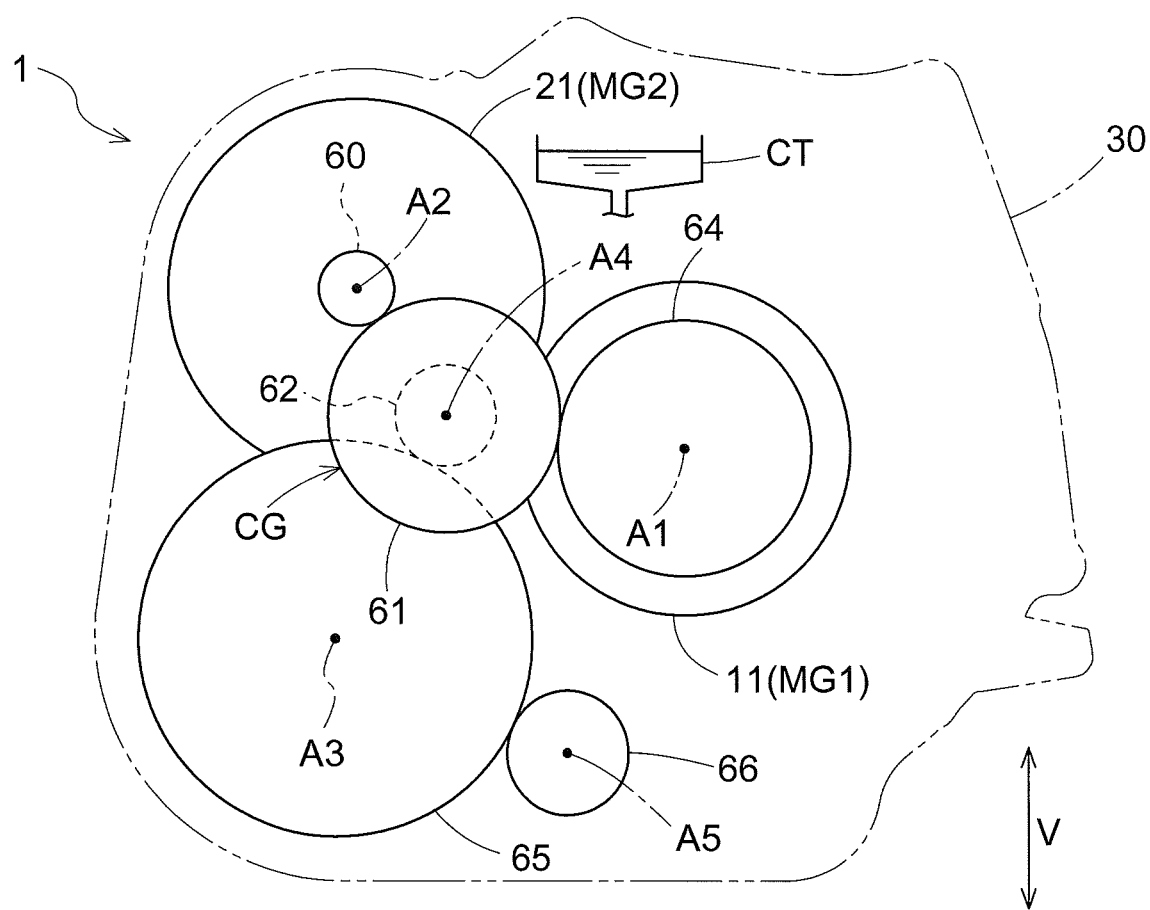
FIG. 4 illustrates the arrangement relationship among components of the vehicle drive device according to the embodiment as viewed in the axial direction.

As illustrated in FIGS. 3 and 4, the first rotary electric machine MG1, the input member 3, the planetary gear mechanism PG, and the second oil pump OP2 are disposed on a first axis A1, the second rotary electric machine MG2 is disposed on a second axis A2, the output member 4 and the output differential gear device DF are disposed on a third axis A3, the counter gear mechanism CG is disposed on a fourth axis A4, and the first oil pump OP1 is disposed on a fifth axis A5. The first axis A1, the second axis A2, the third axis A3, the fourth axis A4, and the fifth axis A5 are axes (imaginary axes) that are different from each other and disposed in parallel with each other. In the following, a direction that is parallel to such axes (A1 to A5) (i.e. an axial direction that is common to the axes) will be defined as an "axial direction L". One side in the axial direction L is defined as a "first axial side L1", and the other side in the axial direction L (i.e. the opposite side from the first axial side L1 in the axial direction L) is defined as a "second axial side L2". In the present embodiment, the vehicle drive device 1 is mounted on the vehicle with the axial direction L directed along a horizontal plane. In the present embodiment, the vehicle drive device 1 is mounted on the vehicle with the axial direction L directed along the right-left direction of the vehicle.

As illustrated in FIG. 1, the first rotary electric machine MG1 includes a first stator 11 and a first rotor 14 supported so as to be rotatable with respect to the first stator 11. The first stator 11 includes a first stator core 12 fixed to the case 30 and a first coil end portion 13. A coil is wound around the first stator core 12. The first coil end portion 13 is a portion of the coil that projects in the axial direction L from the first stator core 12. The first stator 11 includes the first coil end portion 13 on both sides of the first stator core 12 in the axial direction L. The first rotor 14 is fixed to a first rotor shaft 16 to rotate together with the first rotor shaft 16. In the present embodiment, the first rotary electric machine MG1 is a permanent-magnet rotary electric machine (here, an interior permanent magnet synchronous motor), and the first rotor 14 has a first rotor core 14A and a first permanent magnet M1 embedded inside the first rotor core 14A. In the present embodiment, the first rotary electric machine MG1 is an inner-rotor rotary electric machine, and the first rotor 14 is disposed on the inner side in the radial direction (radial direction with reference to the first axis A1) with respect to the first stator core 12.

As illustrated in FIG. 1, the second rotary electric machine MG2 includes a second stator 21 and the second rotor 24 supported so as to be rotatable with respect to the second stator 21. The second stator 21 includes a second stator core 22 fixed to the case 30 and a second coil end portion 23. A coil is wound around the second stator core 22. The second coil end portion 23 is a portion of the coil that projects in the axial direction L from the second stator core 22. The second stator 21 includes the second coil end portion 23 on both sides of the second stator core 22 in the axial direction L. The second rotor 24 includes the second rotor core 24A and the second rotor shaft 26 having a tubular shape and passing through the radially inner side of the second rotor core 24A to be coupled to the second rotor core 24A and to extend along the axial direction L. The second rotor 24 is fixed to the second rotor shaft 26 to rotate together with the second rotor shaft 26. In the present embodiment, the second rotary electric machine MG2 is a permanent-magnet rotary electric machine (here, an interior permanent magnet synchronous motor), and the second rotor 24 has a second permanent magnet M2 embedded inside the second rotor core 24A. In the present embodiment, the second rotary electric machine MG2 is an inner-rotor rotary electric machine, and the second rotor 24 is disposed on the inner side in the radial direction (radial direction with reference to the second axis A2) with respect to the second stator core 22.

The planetary gear mechanism PG has a first rotary element 67 drivably coupled to the first rotary electric machine MG1, a second rotary element 68 drivably coupled to the output member 4, and a third rotary element 69 drivably coupled to the input member 3. In the present embodiment, the first rotary element 67 is coupled so as to rotate together with the first rotary electric machine MG1 (first rotor shaft 16), the second rotary element 68 is coupled so as to rotate together with a distribution output gear 64 meshed with a first gear 61, to be discussed later, of the counter gear mechanism CG, and the third rotary element 69 is coupled so as to rotate together with the input member 3. The input member 3 is a member (a shaft member in the present embodiment) drivably coupled to the internal combustion engine EG (an output shaft such as a crankshaft). The input member 3 is coupled so as to rotate together with the internal combustion engine EG or coupled to the internal combustion engine EG via a different member such as a damper or a clutch. The output member 4 is a member drivably coupled to the wheels W. In the present embodiment, the output member 4 is a member that rotates together with the wheels W. That is, the output member 4 is a member (e.g. a side gear) that rotates together with the wheels W in the output differential gear device DF or a member that constitutes a drive shaft that couples the output differential gear device DF and the wheels W to each other.

In the present embodiment, the planetary gear mechanism PG is a single-pinion planetary gear mechanism. In the present embodiment, the first rotary element 67 is a sun gear, the second rotary element 68 is a ring gear, and the third rotary element 69 is a carrier. Hence, the planetary gear mechanism PG is configured to distribute torque of the internal combustion engine EG, which is transferred to the third rotary element 69, to the first rotary element 67 and the second rotary element 68 (i.e. distribute such torque to the first rotary electric machine MG1 and the output member 4).

The counter gear mechanism CG includes the first gear 61 meshed with the distribution output gear 64 discussed above, a second gear 62 meshed with a differential input gear 65 of the output differential gear device DF, and a coupling shaft 63 that couples the first gear 61 and the second gear 62 to each other. In the present embodiment, the first gear 61 is also meshed with an output gear 60 of the second rotary electric machine MG2. The output gear 60 is a gear that outputs torque of the second rotary electric machine MG2, and is coupled so as to rotate together with the second rotor shaft 26.

The output differential gear device DF splits torque input to the differential input gear 65 to transfer the split torque to a pair of right and left output members 4 (i.e. to a pair of right and left wheels W). The output differential gear device DF is constituted using a bevel-gear or planetary-gear differential gear mechanism, for example.

Since the vehicle drive device 1 according to the present embodiment is configured as described above, the first rotary electric machine MG1 outputs reaction torque, which is a reaction to torque distributed to the first rotary element 67, during execution of a continuously variable speed change travel mode in which torque of the internal combustion engine EG is transferred to the wheels W to cause the vehicle to travel. In this event, the first rotary electric machine MG1 basically functions as a generator, and generates power using torque distributed to the first rotary element 67. During execution of the continuously variable speed change travel mode, torque attenuated with respect to torque of the internal combustion engine EG is distributed to the second rotary element 68 as torque for driving the wheels W, and the second rotary electric machine MG2 outputs torque so as to supplement wheel required torque (torque required to be transferred to the wheels W) as necessary.

During execution of an electric travel mode in which only torque of the second rotary electric machine MG2 is transferred to the wheels W to cause the vehicle to travel, the internal combustion engine EG is basically in a stopped state in which fuel supply is stopped, and the first rotary electric machine MG1 is basically in an idling state (a state in which output torque is controlled to zero through zero torque control).

The vehicle drive device 1 includes a drive transfer mechanism 2 that transfers a drive force of the second rotary electric machine MG2 to the output member 4. In the present embodiment, the drive transfer mechanism 2 includes the counter gear mechanism CG and the output differential gear device DF. In the present embodiment, as illustrated in FIG. 4, the second rotary electric machine MG2 is disposed so as to overlap the counter gear mechanism CG as viewed in the axial direction L. Here, the second rotary electric machine MG2 is disposed so as to overlap the fourth axis A4, on which the counter gear mechanism CG is disposed, as viewed in the axial direction L. In FIG. 4, the reference pitch circle is illustrated for each gear, the outer shape of the first stator 11 (the outer shape of the first stator core 22) is illustrated for the first rotary electric machine MG1, and the outer shape of the second stator 21 (the outer shape of the second stator core 12) is illustrated for the second rotary electric machine MG2.

In the present embodiment, as illustrated in FIG. 1, the counter gear mechanism CG is disposed on the opposite side (second axial side L2) of the second rotary electric machine MG2 from the first axial side L1 in the axial direction L. Specifically, the case 30 includes a first wall portion 31 disposed on the first axial side L1 with respect to the second rotary electric machine MG2 and a second wall portion 32 disposed on the second axial side L2 with respect to the second rotary electric machine MG2. The first wall portion 31 and the second wall portion 32 are each a support wall that supports the second rotor shaft 26. The counter gear mechanism CG is disposed on the second axial side L2 with respect to the second wall portion 32. Here, the first wall portion 31 is disposed on the first axial side L1 adjacently with respect to the second rotary electric machine MG2. The second wall portion 32 is disposed on the second axial side L2 adjacently with respect to the second rotary electric machine MG2. In the present embodiment, the first wall portion 31 is a member that is separate from a peripheral wall portion (a tubular wall portion that surrounds the second rotary electric machine MG2 etc. as viewed in the axial direction L) of the case 30, and joined from the first axial side L1 so as to cover an opening portion of the peripheral wall portion on the first axial side L1. That is, in the present embodiment, the first wall portion 31 is a cover member (specifically, a rear cover that covers the opening portion of the peripheral wall portion on the opposite side from the side on which the internal combustion engine EG is disposed).

Figure 5:
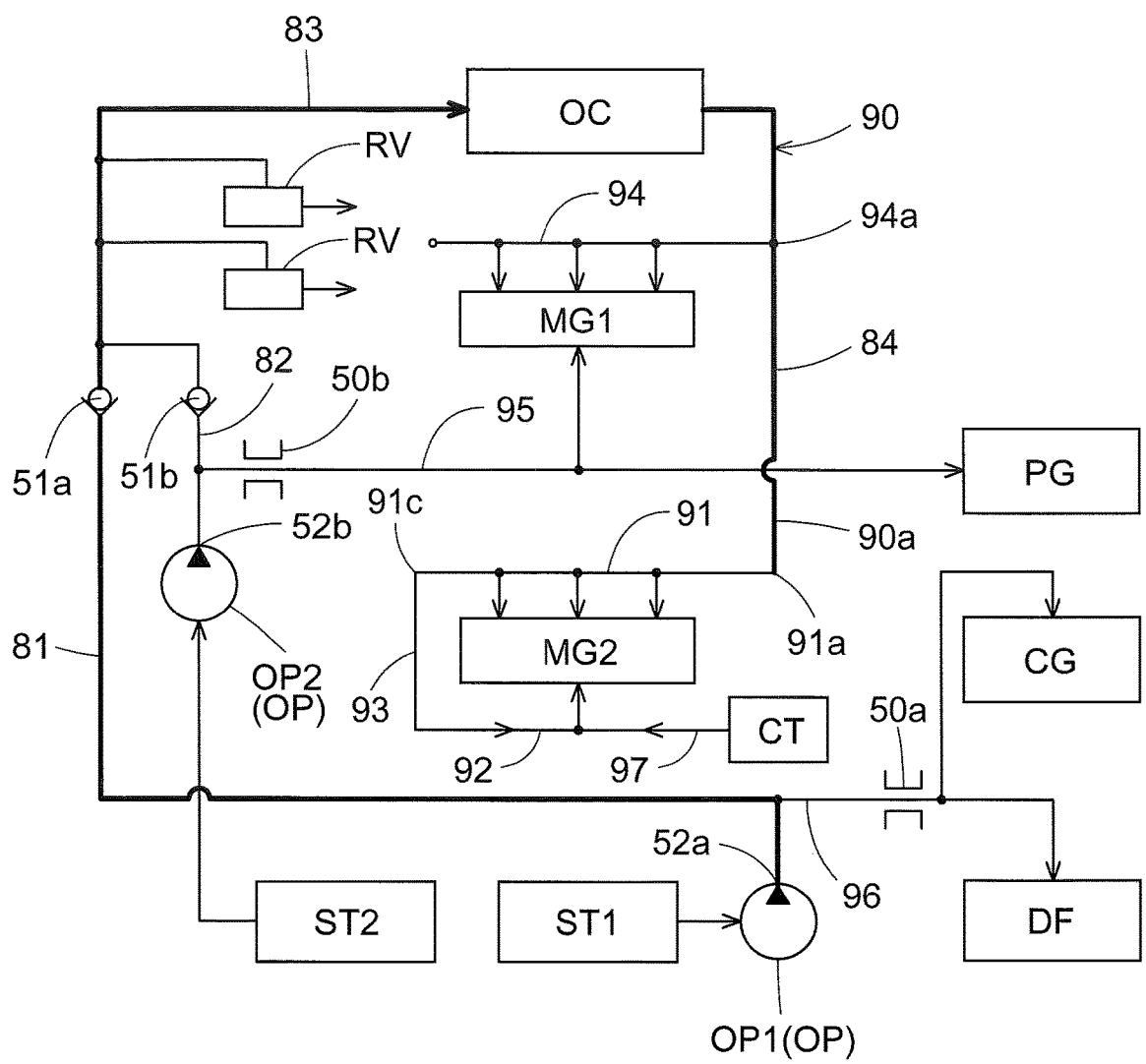
FIG. 5 is a simplified diagram of a hydraulic circuit according to the embodiment.

As illustrated in FIG. 3, the vehicle drive device 1 includes the first oil pump OP1 disposed on an axis different from that of the second rotary electric machine MG2. Although not illustrated, an oil reservoir portion that reserves oil is formed inside the case 30. As illustrated in FIG. 5, the first oil pump OP1 suctions oil in the oil reservoir portion via a first strainer ST1. In the present embodiment, as illustrated in FIG. 3, the vehicle drive device 1 further includes the second oil pump OP2. In the present embodiment, the second oil pump OP2 is disposed coaxially with the first rotary electric machine MG1. As illustrated in FIG. 5, the second oil pump OP2 suctions oil in the oil reservoir portion via a second strainer ST2. The first strainer ST1 and the second strainer ST2 are each a filter that removes foreign matter contained in the oil.

In the present embodiment, the first oil pump OP1 is driven by rotation of the drive transfer mechanism 2. Specifically, the first oil pump OP1 is configured to be driven by rotation of a rotary member of the drive transfer mechanism 2, which is inseparably and drivably coupled to the wheels W (i.e. a rotary member that rotates in conjunction with the wheels W at all times). Hence, in a state in which the vehicle is traveling, the first oil pump OP1 can be driven irrespective of whether the continuously variable speed change travel mode is being executed or the electric travel mode is being executed (i.e. even if the internal combustion engine EG is stationary). The drive transfer mechanism 2 is a mechanism that transfers a drive force of the second rotary electric machine MG2 to the output member 4. Therefore, the second rotor shaft 26 and the first oil pump OP1 are drivably coupled so as to rotate in synchronization with each other at all times at prescribed rotational speed ratios via the drive transfer mechanism 2. Thus, the first oil pump OP1 can be considered as being drivably coupled to the second rotor shaft 26 to be driven by rotation of the second rotor shaft 26. In the present embodiment, as illustrated in FIG. 3, the first oil pump OP1 is configured to be driven by rotation of the differential input gear 65 of the output differential gear device DF. Specifically, a pump drive gear 66 is provided on a first pump drive shaft 53a, which is a drive shaft of the first oil pump OP1. When the pump drive gear 66 is meshed with the differential input gear 65, the first oil pump OP1 is driven by rotation of the differential input gear 65. However, the present disclosure is not limited to such a configuration. The pump drive gear 66 may be configured to be meshed with a gear (the output gear 60, the first gear 61, or the second gear 62 in the present embodiment) of the drive transfer mechanism 2 other than the differential input gear 65.

Figure 2:
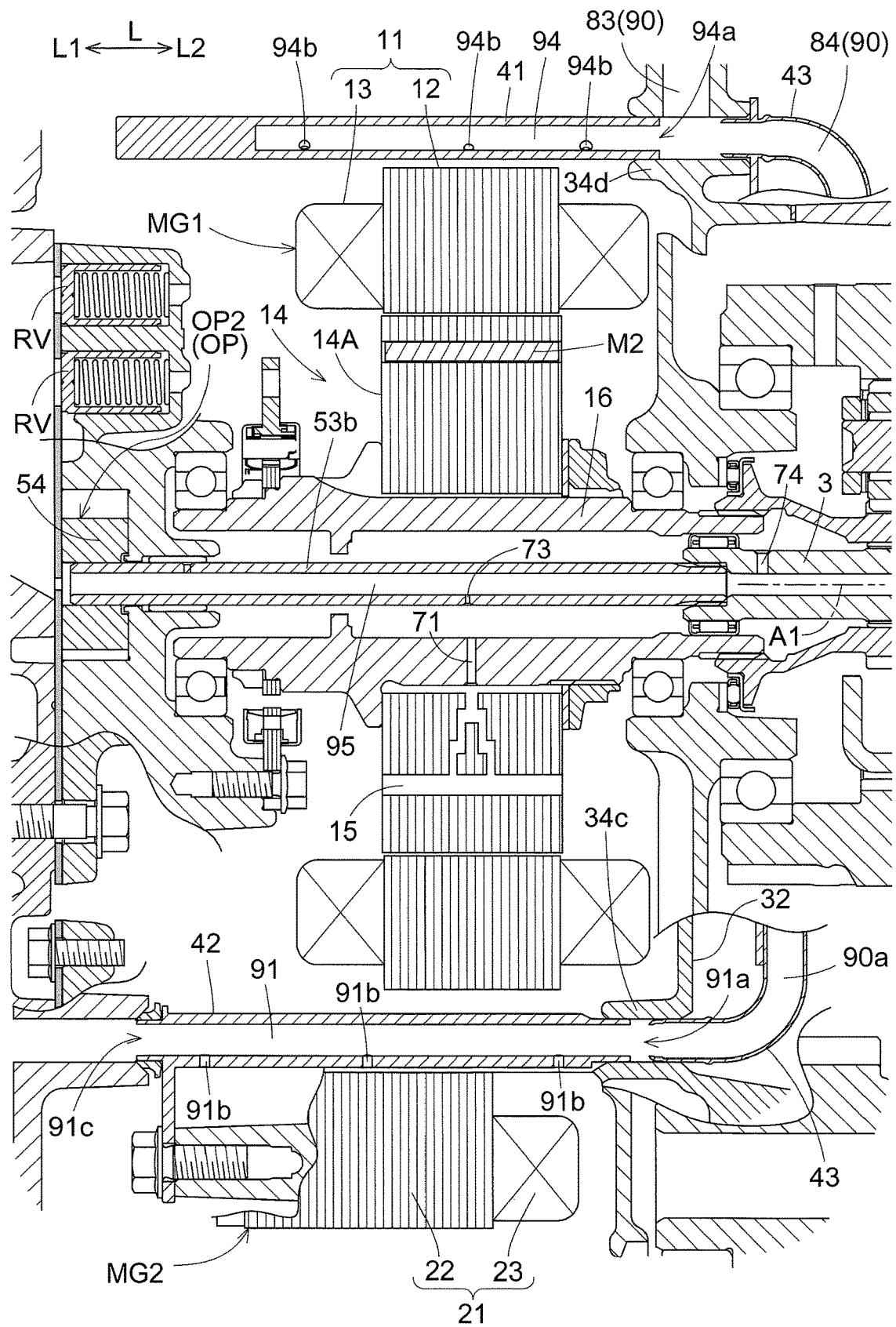
FIG. 2 is a partial enlarged view of FIG. 1.

In the present embodiment, the second oil pump OP2 is driven by rotation of the input member 3. In other words, the second oil pump OP2 is drivably coupled to the internal combustion engine EG to be driven by a drive force of the internal combustion engine EG Specifically, a second pump drive shaft 53b, which is a drive shaft of the second oil pump OP2, is coupled so as to rotate together with the input member 3. As illustrated in FIG. 2, the second pump drive shaft 53b is coupled so as to rotate together with a pump rotor 54 of the second oil pump OP2. Hence, during rotation of the internal combustion engine EG, the second oil pump OP2 can be driven by a drive force (torque) of the internal combustion engine EG irrespective of whether or not the vehicle is traveling. At least one of the first oil pump OP1 and the second oil pump OP2 can be an electric oil pump driven by a dedicated electric motor that drives the pump.

[Oil Flow Structure]

Next, the oil flow structure for oil that flows inside the vehicle drive device 1 will be described. The vehicle drive device 1 includes the oil flow structure discussed below to enable supply of oil to an inner peripheral portion 26I surrounded by a tubular inner peripheral surface F of the second rotor shaft 26 and supply of oil from the inner peripheral portion 26I to the second rotor core 24A, which is disposed on the radially outer side with respect to the second rotor shaft 26, and a portion to be lubricated H. In the present embodiment, the vehicle drive device 1 includes an oil pump OP that supplies oil to an oil supply portion S (oil supply path). In the present example, the oil pump OP includes the first oil pump OP1, which is drivably coupled to the second rotor shaft 26 to be driven by rotation of the second rotor shaft 26, and the second oil pump OP2, which is drivably coupled to the internal combustion engine EG to be driven by drive of the internal combustion engine EG In the present embodiment, the portion to be lubricated H is a bearing B (first bearing B1 to be discussed later) that rotatably supports the second rotor shaft 26. That is, as discussed later, the vehicle drive device 1 includes the first oil pump OP1, a supply oil path 90, a first oil path 91, a second oil path 92 constituted by the inner peripheral portion 26I discussed above, and a third oil path 93 to enable oil discharged by the first oil pump OP1 to cool the second rotary electric machine MG2 and lubricate the bearing B. In the present embodiment, the vehicle drive device 1 further includes a fourth oil path 94 to enable oil discharged by the first oil pump OP1 to also be supplied to the first rotary electric machine MG1. In the present embodiment, the vehicle drive device 1 further includes an oil cooler OC.

As illustrated in FIG. 5, the supply oil path 90 is connected to a first discharge port 52a, which is a discharge port of the first oil pump OP1. In FIG. 5, line segments that indicate the supply oil path 90 are thicker than line segments that indicate the other oil paths. In FIG. 5, the direction in which oil flows in each oil path is indicated by an arrow. In the present embodiment, the supply oil path 90 includes a first discharge oil path 81, a merged oil path 83, and a downstream oil path 84, which are arranged in this order from the upstream side. Specifically, the upstream end portion of the first discharge oil path 81 is connected to the first discharge port 52a, and the downstream end portion of the first discharge oil path 81 is connected to the upstream end portion of the merged oil path 83. The downstream end portion of the merged oil path 83 is connected to the upstream end portion of the downstream oil path 84, and the downstream end portion of the downstream oil path 84 is connected to the upstream end portion (a first inflow portion 91a to be discussed later) of the first oil path 91. Hence, oil discharged by the first oil pump OP1 sequentially flows through the first discharge oil path 81, the merged oil path 83, and the downstream oil path 84 to be supplied to the first oil path 91. The first discharge oil path 81 is provided with a first check valve 51a that regulates the flow of oil toward the upstream side.

In the present embodiment, as discussed above, the vehicle drive device 1 includes the second oil pump OP2 in addition to the first oil pump OP1. In the present embodiment, the upstream end portion of a second discharge oil path 82 is connected to a second discharge port 52b, which is a discharge port of the second oil pump OP2, and the downstream end portion of the second discharge oil path 82 is connected to the upstream end portion of the merged oil path 83. That is, the merged oil path 83 is an oil path formed by merging the first discharge oil path 81 and the second discharge oil path 82 with each other. The second discharge oil path 82 is provided with a second check valve 51b that regulates the flow of oil toward the upstream side.

In the present embodiment, as illustrated in FIG. 5, the supply oil path 90 is provided with the oil cooler OC. The oil cooler OC is a heat exchanger that cools oil. The oil cooler OC is a water-cooled or air-cooled oil cooler, for example. In the present embodiment, the oil cooler OC is provided in the merged oil path 83. A portion of the merged oil path 83 on the upstream side with respect to the oil cooler OC is provided with relief valves RV (two relief valves RV in the present embodiment) that regulate the oil pressure in the merged oil path 83 by discharging a part of oil in the case where the oil pressure is excessive.

As illustrated in FIG. 2, the first oil path 91 is disposed on the upper side in the vertical direction V (see FIG. 4) with respect to the second stator 21. The first oil path 91 has the first inflow portion 91a which is connected to the supply oil path 90 (the downstream oil path 84 in the present embodiment), first discharge holes 91b formed on the first axial side L1 with respect to the first inflow portion 91a to discharge oil toward the second stator 21, and a discharge portion 91c formed on the first axial side L1 with respect to the first discharge holes 91b. Consequently, oil supplied from the supply oil path 90 to the first oil path 91 can be discharged from the first discharge holes 91b toward the second stator 21 to cool the second stator 21.

The first oil path 91 is disposed so as to overlap the second stator 21 as viewed in the vertical direction V. In the present embodiment, as illustrated in FIG. 2, the first oil path 91 has a first discharge hole 91b provided at a position overlapping the second coil end portion 23 on the first axial side L1 as viewed in the vertical direction V, a first discharge hole 91b provided at a position overlapping the second coil end portion 23 on the second axial side L2 as viewed in the vertical direction V, and a first discharge hole 91b provided at a position overlapping the second stator core 22 as viewed in the vertical direction V. Consequently, oil discharged from the first discharge holes 91b can be supplied to the second stator 21 with a relatively simple configuration that utilizes the gravity.

The first oil path 91 is an oil path that has the first inflow portion 91a and the discharge portion 91c as both end portions. The discharge portion 91c is disposed on the first axial side L1 with respect to the first inflow portion 91a. The first oil path 91 is formed so as to extend uniformly toward the first axial side L1 from the first inflow portion 91a to the discharge portion 91c. That is, as illustrated in FIG. 1 in which the direction in which oil flows in each oil path is indicated by an arrow, a flow of oil toward the first axial side L1 is formed in the first oil path 91.

As illustrated in FIG. 1, the second oil path 92 is an oil path formed inside the second rotor shaft 26, to which the second rotor 24 of the second rotary electric machine MG2 is fixed. The second rotor shaft 26 is constituted of a tubular member that extends in the axial direction L. The second oil path 92 which extends in the axial direction L is formed by a space surrounded by the inner peripheral surface F of the second rotor shaft 26. That is, as discussed above, the second oil path 92 is constituted by the inner peripheral portion 26I which is surrounded by the inner peripheral surface F of the second rotor shaft 26. In the present embodiment, further, the second rotor shaft 26 includes a first tubular member 26A and a second tubular member 26B. The first tubular member 26A is disposed on the first axial side L1 with respect to the second tubular member 26B. As illustrated in FIG. 1, an end portion of the first tubular member 26A on the second axial side L2 and an end portion of the second tubular member 26B on the first axial side L1 are coupled to each other. In the present embodiment, the first tubular member 26A and the second tubular member 26B are coupled so as to rotate together with each other with an end portion of the second tubular member 26B on the first axial side L1 fitted (spline-fitted) with the inner peripheral surface of the first tubular member 26A on the radially inner side of an end portion of the first tubular member 26A on the second axial side L2. In the present embodiment, the second oil path 92 (inner peripheral portion 26I) is formed inside the first tubular member 26A of the second rotor shaft 26, and a seventh oil path 97 to be discussed later is formed inside the second tubular member 26B.

Figure 6:
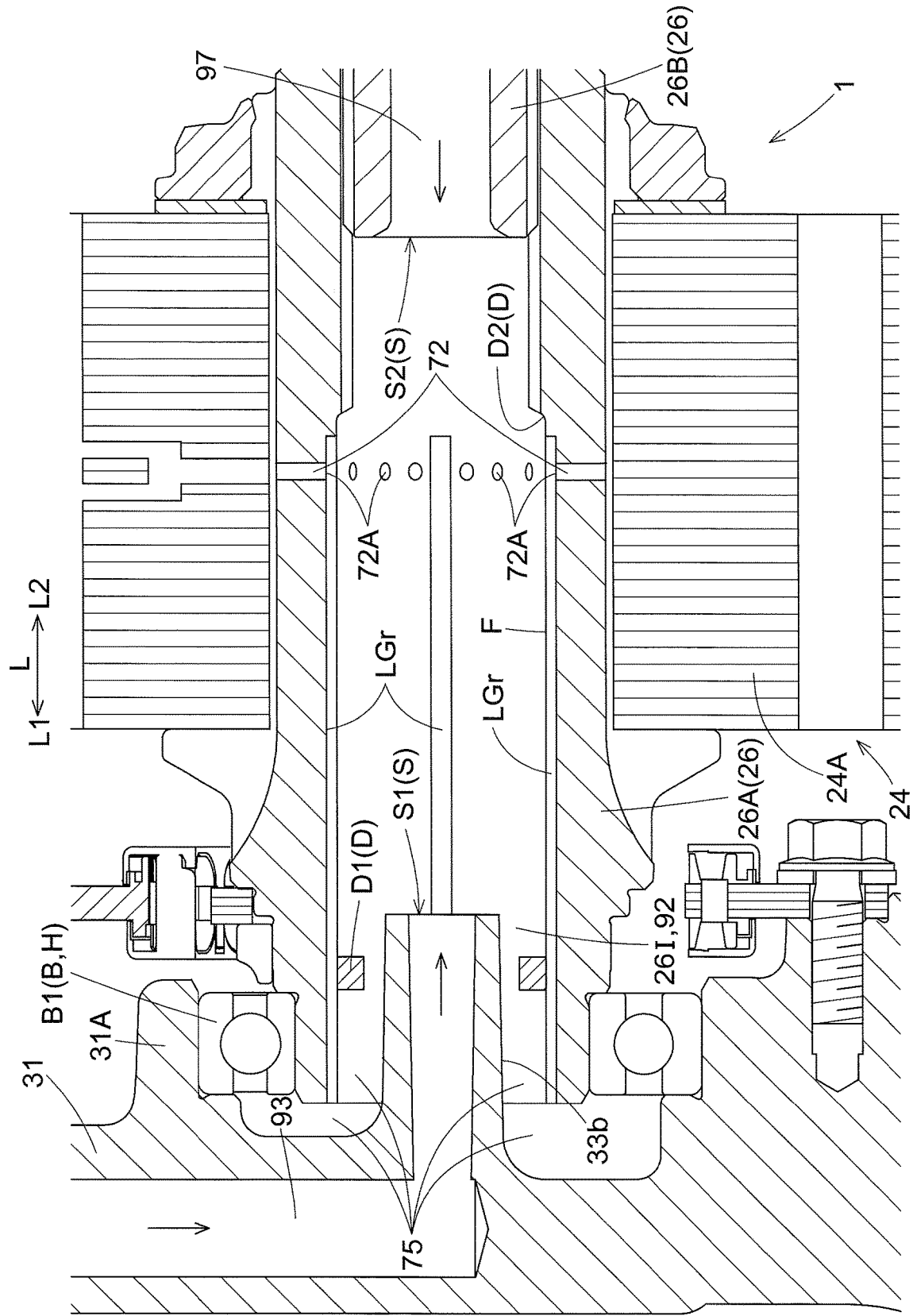
FIG. 6 is a partial enlarged view of FIG. 1.

As illustrated in FIGS. 1 and 6, the second rotor shaft 26 includes radial oil paths 72 that have opening portions 72A (openings) that open in the tubular inner peripheral surface F and that extend along the radial direction (radial direction with reference to the second axis A2). In the present embodiment, the radial oil paths 72 are formed so as to pass through the second rotor shaft 26 in the radial direction, and communicate between the inner peripheral surface F and the outer peripheral surface of the second rotor shaft 26.

A second in-rotor oil path 25 is formed inside the second rotor core 24A. Although not described in detail, the second in-rotor oil path 25 includes an axial oil path that extends in the axial direction L, and a radial oil path that extends in the radial direction to communicate between the inner peripheral surface of the second rotor core 24A and the axial oil path. Consequently, oil in the second oil path 92 can be supplied from the radial oil paths 72 to the second in-rotor oil path 25 to cool the second rotor core 24A. The second rotor core 24A, in particular the second permanent magnet M2 which is embedded in the second rotor core 24A, can be cooled through heat exchange between oil supplied to the second in-rotor oil path 25 and the second rotor core 24A. In the present embodiment, the axial oil path of the second in-rotor oil path 25 is formed so as to open at both end portions of the second rotor core 24A in the axial direction L, which enables oil after cooling the second rotor core 24A to be supplied to the second coil end portion 23 from the inner side in the radial direction to cool the second coil end portion 23.

In the present embodiment, the vehicle drive device 1 includes the third oil path 93 which connects between the discharge portion 91c of the first oil path 91 and the second oil path 92. The third oil path 93 is provided along the first wall portion 31 which is disposed in the case 30 on the first axial side L1 with respect to the second rotary electric machine MG2. That is, at least a part of the third oil path 93 is provided along the first wall portion 31. In the present embodiment, a portion of the third oil path 93 excluding the upstream end portion and the downstream end portion is provided along the first wall portion 31. By providing the third oil path 93 along the first wall portion 31 in this manner, the third oil path 93, through which oil discharged from the first oil pump OP1 is supplied to the second oil path 92, can be provided while suppressing an increase in the size of the vehicle drive device 1 in the axial direction L at a portion at which the third oil path 93 is provided (i.e. a portion at which the second rotary electric machine MG2 is disposed).

In the present embodiment, further, as illustrated in FIGS. 1 and 2, a connection portion 90a, which is a portion of the supply oil path 90 to be connected to the first inflow portion 91a, is provided along the second wall portion 32 which is disposed in the case 30 on the second axial side L2 with respect to the second rotary electric machine MG2. The connection portion 90a is a portion of the supply oil path 90 (the downstream oil path 84 in the present embodiment) including the downstream end portion. At least a part of the connection portion 90a is provided along the second wall portion 32.

In the present embodiment, as illustrated in FIG. 1, the third oil path 93 is formed inside the first wall portion 31. A configuration in which at least a part of the third oil path 93 is formed outside the first wall portion 31 (e.g. a configuration in which at least a part of the third oil path 93 is formed inside a pipe-shaped member attached to the first wall portion 31 from the second axial side L2) may also be adopted. In the present embodiment, the first wall portion 31 has a second connection portion 34b formed in a tubular shape to project toward the second axial side L2 and having an opening portion on the second axial side L2 disposed inside the second rotor shaft 26. The downstream end portion of the third oil path 93 is formed by a space surrounded by the inner peripheral surface of the second connection portion 34b. Consequently, the downstream end portion of the third oil path 93 and an end portion of the second oil path 92 on the first axial side L1 are connected to each other. A first supply portion S1 (first supply path) that supplies oil to the inner peripheral portion 26I (second oil path 92) to be discussed later is formed at the downstream end portion of the third oil path 93.

In the present embodiment, the vehicle drive device 1 further includes the fourth oil path 94 through which oil for cooling the first rotary electric machine MG1 flows. As illustrated in FIG. 5, the fourth oil path 94 is formed as branched from a portion of the supply oil path 90 on the downstream side with respect to the oil cooler OC. Consequently, oil after being cooled by the oil cooler OC can be supplied not only to the first oil path 91 and the second oil path 92 but also to the fourth oil path 94.

As illustrated in FIG. 2, the fourth oil path 94 is disposed on the upper side in the vertical direction V (see FIG. 4) with respect to the first stator 11. The fourth oil path 94 has a second inflow portion 94a connected to an intermediate portion of the supply oil path 90 (the downstream end portion of the merged oil path 83, in other words the upstream end portion of the downstream oil path 84, in the present embodiment), and second discharge holes 94b formed on the first axial side L1 with respect to the second inflow portion 94a to discharge oil toward the first stator 11. Consequently, oil supplied from the supply oil path 90 to the fourth oil path 94 can be discharged from the second discharge holes 94b toward the first stator 11 to cool the first stator 11.

The fourth oil path 94 is disposed so as to overlap the first stator 11 as viewed in the vertical direction V. In the present embodiment, as illustrated in FIG. 2, the fourth oil path 94 has a second discharge hole 94b provided at a position overlapping the first coil end portion 13 on the first axial side L1 as viewed in the vertical direction V, a second discharge hole 94b provided at a position overlapping the first coil end portion 13 on the second axial side L2 as viewed in the vertical direction V, and a second discharge hole 94b provided at a position overlapping the first stator core 12 as viewed in the vertical direction V. Consequently, oil discharged from the second discharge holes 94b can be supplied to the first stator 11 with a relatively simple configuration that utilizes the gravity.

In the present embodiment, as illustrated in FIGS. 2 and 5, the vehicle drive device 1 further includes a fifth oil path 95. As illustrated in FIG. 2, the fifth oil path 95 is an oil path formed inside the second pump drive shaft 53b. The second pump drive shaft 53b is constituted of a tubular member that extends in the axial direction L. The fifth oil path 95 which extends in the axial direction L is formed by a space surrounded by the inner peripheral surface of the second pump drive shaft 53b. As illustrated in FIG. 5, the fifth oil path 95 is formed as branched from a portion of the second discharge oil path 82 on the upstream side with respect to the second check valve 51b. The amount of oil that flows from the second discharge oil path 82 into the fifth oil path 95 is controlled by a second orifice 50b.

A flow of oil toward the second axial side L2 is formed in the fifth oil path 95. As illustrated in FIG. 5, oil in the fifth oil path 95 is supplied to cool the first rotary electric machine MG1 (first rotor 14), and supplied to lubricate the planetary gear mechanism PG Specifically, as illustrated in FIG. 2, the first rotor shaft 16 is constituted of a tubular member that extends in the axial direction L, and the second pump drive shaft 53b is disposed in a space surrounded by the inner peripheral surface of the first rotor shaft 16. The second pump drive shaft 53b includes a second oil hole 73 that communicates between the inner peripheral surface and the outer peripheral surface of the second pump drive shaft 53b. The second oil hole 73 is formed so as to pass through the tubular portion of the second pump drive shaft 53b in the radial direction (radial direction with reference to the first axis A1; the same also applies in this paragraph). The first rotor shaft 16 includes a first oil hole 71 that communicates between the inner peripheral surface and the outer peripheral surface of the first rotor shaft 16. The first oil hole 71 is formed so as to pass through the tubular portion of the first rotor shaft 16 in the radial direction. A first in-rotor oil path 15 is formed inside the first rotor core 14A. Although not described in detail, the first in-rotor oil path 15 includes an axial oil path that extends in the axial direction L, and a radial oil path that extends in the radial direction to communicate between the inner peripheral surface of the first rotor core 14A and the axial oil path.

Consequently, the first rotor core 14A can be cooled by supplying oil in the fifth oil path 95 from the second oil hole 73 to the inner peripheral surface of the first rotor shaft 16 and supplying the oil, which has been supplied to the inner peripheral surface of the first rotor shaft 16, from the first oil hole 71 to the first in-rotor oil path 15. The first rotor core 14A, in particular the first permanent magnet M1 which is embedded in the first rotor core 14A, can be cooled through heat exchange between oil supplied to the first in-rotor oil path 15 and the first rotor core 14A. In the present embodiment, the axial oil path of the first in-rotor oil path 15 is formed so as to open at both end portions of the first rotor core 14A in the axial direction L, which enables oil after cooling the first rotor 14 to be supplied to the first coil end portion 13 from the inner side in the radial direction (radial direction with reference to the first axis A1) to cool the first coil end portion 13. Oil in the fifth oil path 95 flows into an oil path formed inside the input member 3, and is thereafter supplied from a fourth oil hole 74 (see FIGS. 1 and 2) formed in the input member 3 to lubricate the planetary gear mechanism PG etc.

In the present embodiment, as illustrated in FIG. 5, the vehicle drive device 1 further includes a sixth oil path 96. The sixth oil path 96 is formed as branched from a portion of the first discharge oil path 81 on the upstream side with respect to the first check valve 51a. Oil in the sixth oil path 96 is supplied to lubricate the counter gear mechanism CG and the output differential gear device DF. The amount of oil that flows from the first discharge oil path 81 into the sixth oil path 96 is controlled by a first orifice 50a.

In the present embodiment, as illustrated in FIGS. 1 and 5, the vehicle drive device 1 further includes the seventh oil path 97. The seventh oil path 97 is formed inside the second tubular member 26B which constitutes the second rotor shaft 26. A flow of oil toward the first axial side L1 is formed in the seventh oil path 97. In the present embodiment, as illustrated in FIG. 4, the vehicle drive device 1 includes a catch tank CT provided at the upper portion in the case 30 to collect oil splashed by the output member 4 (see FIG. 3) (by the differential input gear 65 in the present example). Oil collected in the catch tank CT flows into the seventh oil path 97 from the second axial side L2 to form a flow of oil toward the first axial side L1 in the seventh oil path 97. As illustrated in the drawings, the downstream end portion of the seventh oil path 97 and an end portion of the second oil path 92 on the second axial side L2 are connected to each other. Thus, oil that flows toward the first axial side L1 through the seventh oil path 97 is supplied to the second oil path 92 (inner peripheral portion 26I). A second supply portion S2 (second supply path) that supplies oil to the inner peripheral portion 26I (second oil path 92) to be discussed later is formed at the downstream end portion of the seventh oil path 97.

In the present embodiment, as illustrated in FIGS. 1 and 2, the vehicle drive device 1 includes a first oil flow passage pipe 41, a second oil flow passage pipe 42, and a third oil flow passage pipe 43. The fourth oil path 94 is formed inside the first oil flow passage pipe 41. The first oil path 91 is formed inside the second oil flow passage pipe 42. The downstream oil path 84 is formed inside the third oil flow passage pipe 43. In the present embodiment, as illustrated in FIG. 1, the first wall portion 31 has a first connection portion 34a formed in a tubular shape to project toward the second axial side L2. The upstream end portion of the third oil path 93 is formed by a space surrounded by the inner peripheral surface of the first connection portion 34a. The second oil flow passage pipe 42 is disposed such that the discharge portion 91c is connected to the first connection portion 34a. Consequently, the downstream end portion (discharge portion 91c) of the first oil path 91 and the upstream end portion of the third oil path 93 are connected to each other at the first connection portion 34a. The second oil flow passage pipe 42 is disposed such that both end portions thereof are disposed at different positions in the axial direction L (e.g. along the axial direction L). The discharge portion 91c of the first oil path 91 is formed by an opening portion of the second oil flow passage pipe 42 on the first axial side L1. The first discharge holes 91b discussed above are formed so as to pass through the tubular portion of the second oil flow passage pipe 42.

In the present embodiment, as illustrated in FIG. 2, the second wall portion 32 includes a third connection portion 34c formed in a tubular shape to extend in the axial direction L. An end portion of the second oil flow passage pipe 42 on the second axial side L2 is fitted with the inner peripheral surface of the third connection portion 34c from the first axial side L1. An end portion of the third oil flow passage pipe 43 is fitted with the inner peripheral surface of the third connection portion 34c from the second axial side L2. Consequently, the downstream end portion of the downstream oil path 84 and the upstream end portion (first inflow portion 91a) of the first oil path 91 are connected to each other at the third connection portion 34c. The first inflow portion 91a of the first oil path 91 is formed by an opening portion of the second oil flow passage pipe 42 on the second axial side L2.

In the present embodiment, as illustrated in FIG. 2, the second wall portion 32 includes a fourth connection portion 34d formed in a tubular shape to extend in the axial direction L. An end portion of the first oil flow passage pipe 41 on the second axial side L2 is fitted with the inner peripheral surface of the fourth connection portion 34d from the first axial side L1. An end portion of the third oil flow passage pipe 43 (an end portion on the opposite side from an end portion connected to the third connection portion 34c) is fitted with the inner peripheral surface of the fourth connection portion 34d from the second axial side L2. The downstream end portion of the merged oil path 83 is formed so as to open in the inner peripheral surface of the fourth connection portion 34d. Consequently, the downstream end portion of the merged oil path 83, the upstream end portion of the downstream oil path 84, and the upstream end portion (second inflow portion 94a) of the fourth oil path 94 are connected to each other at the fourth connection portion 34d. The first oil flow passage pipe 41 is disposed such that both end portions thereof are disposed at different positions in the axial direction L (e.g. along the axial direction L). The second inflow portion 94a of the fourth oil path 94 is formed by an opening portion of the first oil flow passage pipe 41 on the second axial side L2. The second discharge holes 94b discussed above are formed so as to pass through the tubular portion of the first oil flow passage pipe 41.

[Travel Mode and Oil Flow]

Next, the flow of oil in the vehicle drive device 1 for a case where the vehicle drive device 1 is executing each of a plurality of travel modes will be described.

The vehicle drive device 1 is configured to be able to execute a hybrid travel mode (HV travel mode), in which the vehicle travels using at least the internal combustion engine EG as a power source, and an electric travel mode (EV travel mode), in which the vehicle travels using only the second rotary electric machine MG2, among the internal combustion engine EG, the first rotary electric machine MG1, and the second rotary electric machine MG2, as a power source.

As illustrated in FIG. 3, the second oil pump OP2 is coupled to the internal combustion engine EG via the input member 3. Thus, while the vehicle drive device 1 is executing the HV travel mode (while the vehicle is traveling in the HV travel mode), the second oil pump OP2 is driven by drive of the internal combustion engine EG, and the first oil pump OP1 is driven by rotation of the output member 4 and the second rotary electric machine MG2. Oil discharged by the first oil pump OP1 is supplied to the supply oil path 90, and supplied via the sixth oil path 96 to lubricate the counter gear mechanism CG and the output differential gear device DF. Oil discharged by the second oil pump OP2 is supplied to the supply oil path 90 via the second discharge oil path 82. Normally, during execution of the HV travel mode, the discharge pressure of the second oil pump OP2 is higher than the discharge pressure of the first oil pump OP1, and therefore oil discharged by the first oil pump OP1 is mainly supplied to the sixth oil path 96.

Therefore, in the HV travel mode, oil discharged from the second oil pump OP2 is mainly supplied to the second oil path 92 (inner peripheral portion 26I) from the first axial side L1 via the third oil path 93. Oil supplied to the second oil path 92 (inner peripheral portion 26I) in this manner is cooled by the oil cooler OC in the course of flowing through the supply oil path 90, and therefore can be suitably used as cooling oil for cooling the second rotary electric machine MG2. Further, while the vehicle drive device 1 is executing the HV travel mode, oil is splashed by the differential input gear 65 along with rotation of the output member 4. The thus splashed oil is collected in the catch tank CT, and supplied to the second oil path 92 (inner peripheral portion 26I) from the second axial side L2 via the seventh oil path 97. Thus, while the vehicle drive device 1 is executing the HV travel mode, oil is supplied to the second oil path 92 (inner peripheral portion 26I) from both sides in the axial direction L, and therefore a relatively large amount of oil is supplied to the second oil path 92 (inner peripheral portion 26I).

While the vehicle drive device 1 is executing the EV travel mode (the vehicle is traveling in the EV travel mode), on the other hand, oil is splashed by the differential input gear 65 along with rotation of the output member 4. The thus splashed oil is collected in the catch tank CT, and supplied to the second oil path 92 (inner peripheral portion 26I) from the second axial side L2 via the seventh oil path 97. While the vehicle drive device 1 is executing the EV travel mode, the first oil pump OP1 is driven by rotation of the output member 4 and the second rotary electric machine MG2, besides oil being splashed by the differential input gear 65. However, in the case where the vehicle is traveling at a low speed, for example, the rotational speed of the output member 4 is also low, and the amount of oil discharged by the first oil pump OP1 is relatively small. Further, oil discharged by the first oil pump OP1 is supplied via the sixth oil path 96 to lubricate the counter gear mechanism CG and the output differential gear device DF.

Therefore, in the EV travel mode, oil is supplied mainly from the catch tank CT to the second oil path 92 (inner peripheral portion 26I) from the second axial side L2 via the seventh oil path 97. That is, in the EV travel mode, no (or little) oil is supplied from the first axial side L1 to the second oil path 92 (inner peripheral portion 26I), and a relatively small amount of oil is supplied mainly from the second axial side L2 to the second oil path 92 (inner peripheral portion 26I).

[Detailed Configuration of Rotor for Rotary Electric Machine]

Next, the detailed configuration of a rotor for a rotary electric machine, here the second rotor 24 of the second rotary electric machine MG2, will be described.

As discussed above, the second rotor 24 includes the second rotor core 24A and the tubular second rotor shaft 26, and the second rotor shaft 26 includes the first tubular member 26A and the second tubular member 26B which are arranged along the axial direction L and coupled to each other. In the present embodiment, as illustrated in FIG. 1, the second rotor shaft 26 is supported by four bearings B so as to be rotatable with respect to the case 30. In the present embodiment, the first bearing B1 is defined as the portion to be lubricated H which is disposed on the first axial side L1 with respect to the second rotor core 24A. A second bearing B2 is disposed on the second axial side L2 with respect to the second rotor core 24A. Preferably, the second bearing B2 is also defined as a to be lubricated. In the illustrated example, the first tubular member 26A is supported by the first bearing B1 on the first axial side L1 with respect to the second rotor core 24A, and supported by the second bearing B2 on the second axial side L2 with respect to the second rotor core 24A. The second tubular member 26B is supported by a third bearing B3 on the first axial side L1 with respect to the output gear 60, and supported by a fourth bearing B4 on the second axial side L2 with respect to the output gear 60.

In the present embodiment, the first wall portion 31 has a tubular first boss portion 31A that projects toward the second axial side L2. The first bearing B1 is supported by the inner peripheral surface of the first boss portion 31A, and supports the outer peripheral surface of the second rotor shaft 26 (here, the first tubular member 26A). As described above, the first bearing B1 rotatably supports the second rotor shaft 26 on the first axial side L1 with respect to the second rotor core 24A. In the present embodiment, as discussed above, the first bearing B1 functions as the "portion to be lubricated H".

In the present embodiment, the second wall portion 32 has a tubular second boss portion 32A that projects toward the first axial side L1. The second bearing B2 is supported by the inner peripheral surface of the second boss portion 32A, and supports the outer peripheral surface of the second rotor shaft 26 (here, the first tubular member 26A).

In the present embodiment, the second wall portion 32 has a tubular third boss portion 32B that projects toward the second axial side L2. In the illustrated example, the third boss portion 32B is formed integrally with and the second boss portion 32A, and the second boss portion 32A and the third boss portion 32B project toward opposite sides from each other along the axial direction L. The third bearing B3 is supported by the inner peripheral surface of the third boss portion 32B, and supports the outer peripheral surface of the second rotor shaft 26 (here, the second tubular member 26B).

In the present embodiment, the case 30 includes a third wall portion 33 in addition to the first wall portion 31 and the second wall portion 32. The third wall portion 33 is disposed in the case 30 on the second axial side L2 with respect to the counter gear mechanism CG and the second rotor shaft 26 (second tubular member 26B). In the illustrated example, a large portion of the second tubular member 26B of the second rotor shaft 26 is housed between the second wall portion 32 and the third wall portion 33 in the axial direction L. The counter gear mechanism CG discussed above is also housed between the second wall portion 32 and the third wall portion 33 in the axial direction L. In the present embodiment, the third wall portion 33 has a tubular fourth boss portion 33A that projects toward the first axial side L1. The fourth bearing B4 is supported by the inner peripheral surface of the fourth boss portion 33A, and supports the outer peripheral surface of the second rotor shaft 26 (here, the second tubular member 26B).

As illustrated in FIGS. 1 and 6, the second rotor 24 includes the oil supply portion S which supplies oil to the second rotor shaft 26. As discussed above, the second rotor shaft 26 includes the inner peripheral portion 26I which is surrounded by the tubular inner peripheral surface F, and the oil supply portion S supplies oil to the inner peripheral portion 26I. As discussed above, the inner peripheral portion 26I constitutes the second oil path 92.

In the present embodiment, the oil supply portion S includes the first supply portion S1 and the second supply portion S2. The first supply portion S1 supplies oil from an end portion of the second rotor shaft 26 on the first axial side L1 to the inner peripheral portion 26I. The second supply portion S2 supplies oil from an end portion of the second rotor shaft 26 on the second axial side L2 to the inner peripheral portion 26I. Here, the first supply portion S1 is formed at the downstream end portion of the third oil path 93. As illustrated in FIG. 5, oil discharged from the first oil pump OP1 and oil discharged from the second oil pump OP2 is supplied from the first supply portion Si to the inner peripheral portion 26I. The second supply portion S2 is formed at the downstream end portion of the seventh oil path 97. As illustrated in FIG. 5, oil from the catch tank CT (oil splashed along with rotation of the output member 4) is supplied from the second supply portion S2 to the inner peripheral portion 26I.

As illustrated in FIGS. 1 and 6, the second rotor 24 includes a lubrication oil path 75 through which oil is supplied to the first bearing B 1. In the present embodiment, the lubrication oil path 75 is formed from an opening portion at an end portion of the second rotor shaft 26 (first tubular member 26A) on the first axial side L1, and a shaft-end outside space between an end portion of the second rotor shaft 26 on the first axial side L1 and a surface, on the second axial side L2, of the first wall portion 31 of the case 30. Here, the shaft-end outside space is a space surrounded by the first wall portion 31, the second rotor shaft 26, and the first bearing B1. As discussed later, a weir portion D (weir) (first weir portion D1) is formed inside the second rotor shaft 26, and the lubrication oil path 75 is disposed on the first axial side L1 with respect to the weir portion D (first weir portion D1). Oil that has flowed out toward the first axial side L1 with respect to the weir portion D (first weir portion D1) in the second rotor shaft 26 is led to the first bearing B1 through the lubrication oil path 75 to lubricate the first bearing B1.

As illustrated in FIG. 6, the second rotor shaft 26 includes the radial oil paths 72 which have the opening portions 72A which open in the inner peripheral surface F and which extend along the radial direction (radial direction with reference to the second axis A2; the same also applies in the following paragraphs describing [Detailed Configuration of Rotor for Rotary Electric Machine]). The opening portions 72A are formed at the radially inner end portions of the radial oil paths 72. The radially outer end portions of the radial oil paths 72 open in the outer peripheral surface of the second rotor shaft 26. In the present embodiment, the second rotor shaft 26 includes a plurality of radial oil paths 72 dispersed in the circumferential direction, and a plurality of opening portions 72A are formed along the circumferential direction in the inner peripheral surface F. In the illustrated example, the plurality of opening portions 72A are arranged in one row along the circumferential direction at the same position in the axial direction L. Oil supplied to the inner peripheral portion 26I enters the radial oil paths 72 from the opening portions 72A, and is led to the second rotor core 24A through the radial oil paths 72 to cool the second rotor core 24A.

As illustrated in FIG. 6, the second rotor shaft 26 includes the first weir portion D1 which is annular and disposed so as to project radially inward from the inner peripheral surface F and extend in the circumferential direction along the inner peripheral surface F. The first weir portion D1 is disposed on the first axial side L1 with respect to the opening portions 72a. The oil supply portion S (first supply portion S1) is configured to supply oil to a portion of the inner peripheral portion 26I on the second axial side L2 with respect to the first weir portion D1. Therefore, in the illustrated example, the first supply portion S1 is provided so as to open on the second axial side L2 with respect to the first weir portion D1. In the present embodiment, the first weir portion D1 is constituted as a member that is separate from the second rotor shaft 26 (first tubular member 26A), and press-fitted into the radially inner side of the second rotor shaft 26 to be attached inside the second rotor shaft 26. However, the present disclosure is not limited to such a configuration. For example, the first weir portion D1 may be formed integrally with the second rotor shaft 26 (first tubular member 26A) by casting or the like. Alternatively, the first weir portion D1 may be formed by cutting or the like.

In the present embodiment, the second rotor shaft 26 further includes an annular second weir portion D2 disposed on the second axial side L2 with respect to the opening portions 72A and disposed so as to project radially inward from the inner peripheral surface F and extend in the circumferential direction along the inner peripheral surface F. A space between the first weir portion D1 and the second weir portion D2 in the axial direction L serves as an in-shaft reservoir portion that reserves oil. The opening portions 72A are disposed so as to open in the in-shaft reservoir portion. Thus, oil reserved in the in-shaft reservoir portion between the first weir portion D1 and the second weir portion D2 can be caused to efficiently flow into the opening portions 72A using a centrifugal force etc. due to rotation of the second rotor shaft 26. Hence, when oil is reserved in the in-shaft reservoir portion, an amount of oil needed to cool the second rotor core 24A can be supplied from the opening portions 72A to the second rotor core 24A via the radial oil paths 72. In the present embodiment, the second weir portion D2 is constituted of a stepped portion provided at a spline-fitting portion at which the first tubular member 26A and the second tubular member 26B are spline-fitted with each other as discussed above. However, the present disclosure is not limited to such a configuration. The second weir portion D2 may be constituted of a simple stepped portion that is irrelevant to the spline-fitting portion. Alternatively, the second weir portion D2 may be an annular member attached to the inner peripheral surface F of the second rotor shaft 26, as with the first weir portion D1.

With such a configuration, oil can be reserved in the inner peripheral portion 26I, and an amount of oil enough to cool the second rotor core 24A can be supplied to the radial oil paths 72. As discussed above, the lubrication oil path 75 for supplying oil to the first bearing B1 is disposed on the first axial side L1 with respect to the first weir portion D1. Therefore, oil dammed by the first weir portion D1 does not easily flow toward the first axial side L1 with respect to the first weir portion D1, and the first bearing B1 may not be lubricated sufficiently.

Thus, as illustrated in FIG. 6, the second rotor 24 includes axial communication paths LGr provided in the inner peripheral surface F or the weir portion D to communicate between a portion of the inner peripheral portion 26I on the first axial side L1 with respect to the weir portion D and a portion thereof on the second axial side L2 with respect to the weir portion D. In the present embodiment, the axial communication paths LGr are provided in the inner peripheral surface F to be dented radially outward, and formed so as to extend in the axial direction L through the radially outer side with respect to the weir portion D. The axial communication paths LGr communicate with the lubrication oil path 75. In the present embodiment, the axial communication paths LGr extend from the second axial side L2 to the first axial side L1 with respect to the first weir portion D1 through the radially outer side with respect to the first weir portion D1 to communicate with the lubrication oil path 75. Consequently, oil supplied to the inner peripheral portion 26I flows into the axial communication paths LGr on the second axial side L2 with respect to the first weir portion D1, flows toward the first axial side L1 through the axial communication paths LGr, and flows into the lubrication oil path 75 which is disposed on the first axial side L1 with respect to the first weir portion D1. Oil that has flowed into the lubrication oil path 75 is supplied to the first bearing B1 to lubricate the first bearing B1. Thus, with this configuration, oil can be supplied to both the radial oil paths 72 and the lubrication oil path 75, and it is possible to both cool the second rotor core 24A and lubricate the first bearing B1 appropriately. In the present embodiment, the axial communication paths LGr are formed continuously from a location on the second axial side L2 with respect to the first weir portion D1 to an end portion of the second rotor shaft 26 on the first axial side L1.

Figure 7:
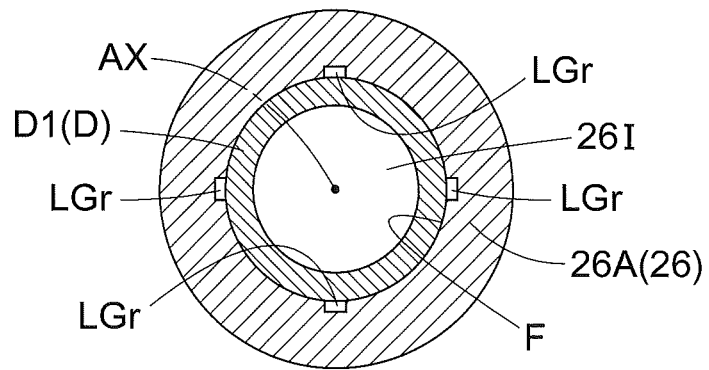
FIG. 7 is a cross-sectional view of a rotor shaft according to the embodiment.
Figure 8:
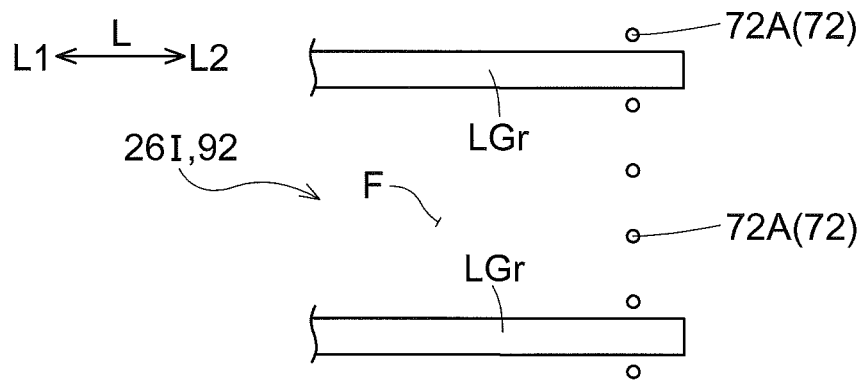
FIG. 8 is a schematic development view of the rotor shaft as developed in the circumferential direction.

In the present embodiment, a plurality of axial communication paths LGr are disposed side by side in the circumferential direction of the inner peripheral surface F. In the present example, as illustrated in FIG. 7, four axial communication paths LGr are disposed at equal intervals (at intervals of 90°) side by side in the circumferential direction. In the illustrated example, the axial communication paths LGr are each formed in a groove shape having a rectangular cross section as viewed in the axial direction L. The cross-sectional shape of the axial communication paths LGr is not limited thereto. The axial communication paths LGr may have a variety of groove shapes such as an arcuate shape and various polygonal shapes. Consequently, oil can be led to the first axial side L1 with respect to the first weir portion D1 through the axial communication paths LGr irrespective of the position of the second rotor shaft 26 in the rotational direction. However, the present disclosure is not limited to the configuration described above. The plurality of axial communication paths LGr may be disposed at non-uniform intervals in the circumferential direction. The number of the axial communication paths LGr may be determined as desired, and may be one to three or five or more. FIG. 8 is a development view illustrating the inner peripheral portion 26I as developed in the circumferential direction for a range of 180°, illustrating two axial communication paths LGr among the four axial communication paths LGr.

In the present embodiment, as illustrated in FIGS. 6 and 8, end portions of the axial communication paths LGr on the second axial side L2 are disposed on the second axial side L2 with respect to the opening portions 72A. Consequently, oil on the second axial side L2 with respect to the opening portions 72A can easily enter the axial communication paths LGr before entering the opening portions 72A. Therefore, oil can be preferentially supplied to the axial communication paths LGr even in the case where the amount of oil supplied to the inner peripheral portion 26I is small, such as a case where the vehicle drive device 1 is executing the EV travel mode. Thus, the first bearing B1 can be lubricated appropriately even in the case where the amount of oil supplied to the inner peripheral portion 26I is small. End portions of the axial communication paths LGr on the second axial side L2 are disposed on the first axial side L1 with respect to the second weir portion D2.

In the present embodiment, as illustrated in FIGS. 6 and 8, the axial communication paths LGr and the opening portions 72A are disposed such that the axial communication paths LGr and the opening portions 72A are at different positions in the circumferential direction at the same position in the axial direction L. Specifically, the plurality of axial communication paths LGr and the plurality of opening portions 72A are disposed such that an axial communication path LGr is disposed between a pair of opening portions 72A that are adjacent to each other in the circumferential direction. With this configuration, oil that has entered the axial communication paths LGr once does not flow into the opening portions 72A, and therefore oil can be appropriately distributed to the axial communication paths LGr and the radial oil paths 72. Thus, it is possible to both cool the second rotor core 24A and lubricate the first bearing B1 appropriately.

With the configuration according to the present embodiment, as described above, a certain amount of oil supplied from the first supply portion S1 (third oil path 93) or the second supply portion S2 (seventh oil path 97) to the inner peripheral portion 26I (second oil path 92) can be kept in the inner peripheral portion 26I between the first weir portion D1 and the second weir portion D2. For example, while the vehicle drive device 1 is executing the EV travel mode, most of the oil supplied to the inner peripheral portion 26I is oil supplied from the second supply portion S2 (seventh oil path 97) as discussed above, and a relatively small amount of oil is supplied to the inner peripheral portion 26I. Even in such a case, oil can be preferentially supplied to the lubrication oil path 75 via the axial communication paths LGr, which allows appropriately securing oil for lubricating the first bearing B1. On the other hand, while the vehicle drive device 1 is executing the HV travel mode, for example, oil is supplied to the inner peripheral portion 26I from both the first supply portion S1 (third oil path 93) and the second supply portion S2 (seventh oil path 97) as discussed above, and a relatively large amount of oil is supplied to the inner peripheral portion 26I. In this case, a larger amount of oil is supplied to the inner peripheral portion 26I than the amount of oil that flows through the axial communication paths LGr in the inner peripheral portion 26I, as a result of which oil is reserved in the inner peripheral portion 26I between the first weir portion D1 and the second weir portion D2. The thus reserved oil is efficiently supplied to the radial oil paths 72 by a centrifugal force etc. due to rotation of the second rotor shaft 26. Thus, in such a case, it is possible to both lubricate the first bearing B1 and cool the second rotor core 24A appropriately.

2. Second Embodiment

Next, a rotor for a rotary electric machine according to a second embodiment will be described. The following mainly describes differences from the first embodiment described above. Features that are the same as those according to the first embodiment described above will not be specifically described.

Figure 9:
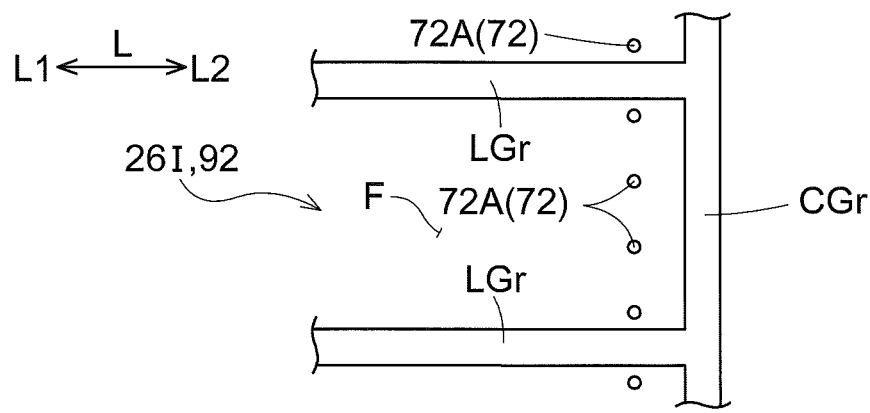
FIG. 9 is a schematic development view of a rotor shaft according to a second embodiment as developed in the circumferential direction.

FIG. 9 is a development view illustrating the inner peripheral portion 26I of the rotor for a rotary electric machine (second rotor 24) according to the present embodiment as developed in the circumferential direction for a range of 180°.

In the present embodiment, as illustrated in FIG. 9, the second rotor 24 includes a circumferential groove CGr provided in the inner peripheral surface F to extend in the circumferential direction. In the illustrated example, the circumferential groove CGr extends in the circumferential direction orthogonally to the axial direction L. In the present embodiment, the circumferential groove CGr is provided continuously over the entire region of the inner peripheral surface F in the circumferential direction. However, the present disclosure is not limited to such a configuration. The circumferential groove CGr may be provided in a part of the region of the inner peripheral surface F in the circumferential direction, or may be provided intermittently.

In the present embodiment, the circumferential groove CGr is disposed on the second axial side L2 with respect to the opening portions 72A, and connected to the axial communication paths LGr. Oil guided to the circumferential groove CGr is guided to the axial communication paths LGr. Thus, with the present configuration, oil supplied to the second axial side L2 with respect to the circumferential groove CGr enters the circumferential groove CGr before entering the opening portions 72A, and is led from the circumferential groove CGr to the axial communication paths LGr. Therefore, oil on the second axial side L2 with respect to the circumferential groove CGr can be guided to the axial communication paths LGr preferentially to the radial oil paths 72. Thus, the first bearing B1 can be lubricated appropriately even in the case where the amount of oil supplied to the inner peripheral portion 26I is small, such as a case where the vehicle drive device 1 is executing the EV travel mode.

The circumferential groove CGr is preferably connected to at least two axial communication paths LGr. In the present embodiment, the circumferential groove CGr is connected to all the axial communication paths LGr (four axial communication paths LGr). Consequently, the first bearing B1 can be lubricated reliably since oil can be easily supplied to the axial communication paths LGr even in the case where the amount of oil supplied to the inner peripheral portion 26I is small.

3. Other Embodiments

Next, rotors for a rotary electric machine according to other embodiments will be described.

Figure 10:
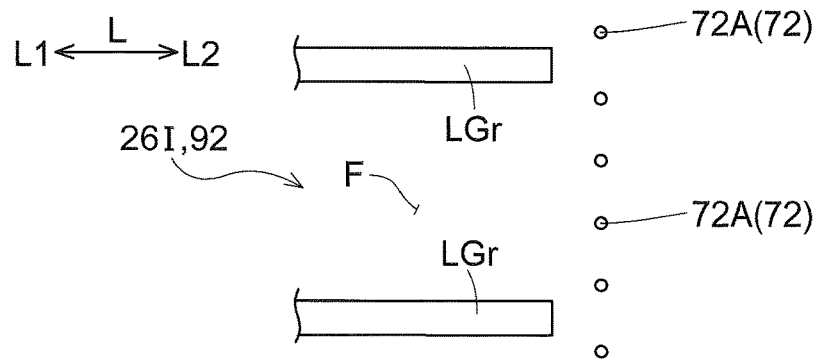
FIG. 10 is a schematic development view of a rotor shaft according to a different embodiment as developed in the circumferential direction.

(1) In each of the embodiments described above, end portions of the axial communication paths LGr on the second axial side L2 are disposed on the second axial side L2 with respect to the opening portions 72A. However, the present disclosure is not limited to such a configuration. For example, as illustrated in FIG. 10, end portions of the axial communication paths LGr on the second axial side L2 may be disposed on the first axial side L1 with respect to the opening portions 72A, or may be disposed at the same position as the opening portions 72A in the axial direction L (not illustrated).

Figure 11:
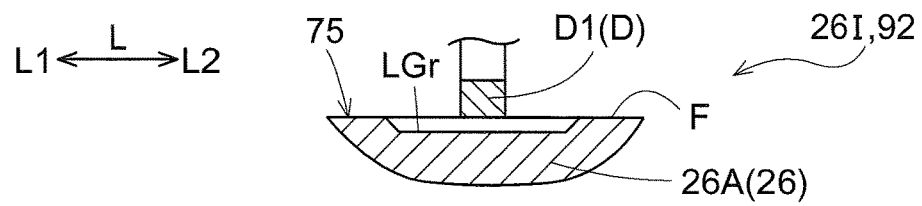
FIG. 11 is an axial sectional view of an essential portion of a rotor for a rotary electric machine according to a different embodiment.

(2) In each of the embodiments described above, the axial communication paths LGr are formed continuously from a location on the second axial side L2 with respect to the first weir portion D1 to an end portion of the second rotor shaft 26 on the first axial side L1. However, the present disclosure is not limited to such a configuration. It is only necessary that the axial communication paths LGr should extend between the first axial side L1 with respect to the first weir portion D1 and the second axial side L2 with respect to the first weir portion D1. For example, as illustrated in FIG. 11, the axial communication paths LGr may be formed only in a region overlapping the first weir portion D1 as viewed in the radial direction and regions on both sides thereof in the axial direction L. In this case, the lubrication oil path 75 is formed to extend from end portions of the axial communication paths LGr on the first axial side L1 to the first bearing B1 (see FIG. 6).

(3) In each of the embodiments described above, the axial communication paths LGr extend straight along the axial direction L, and the plurality of axial communication paths LGr and the plurality of opening portions 72A are disposed such that the axial communication paths LGr and the opening portions 72A are at different positions in the circumferential direction at the same position in the axial direction L. However, the present disclosure is not limited to such a configuration. The axial communication paths LGr may extend in a direction inclined with respect to the axial direction L. In this case, the plurality of axial communication paths LGr and the plurality of opening portions 72A may be disposed such that the axial communication paths LGr and the opening portions 72A are at the same position in the circumferential direction at different positions in the axial direction L (at positions away from each other in the axial direction L).

Figure 12:
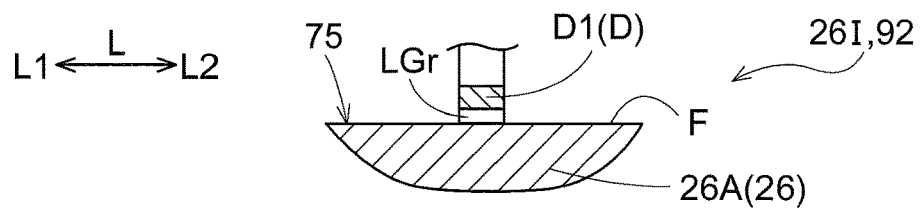
FIG. 12 is an axial sectional view of an essential portion of a rotor for a rotary electric machine according to a different embodiment.
Figure 13:
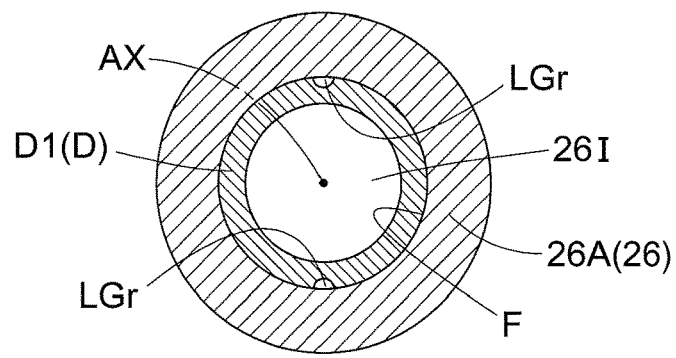
FIG. 13 is a cross-sectional view of a rotor shaft according to a different embodiment.
Figure 14:
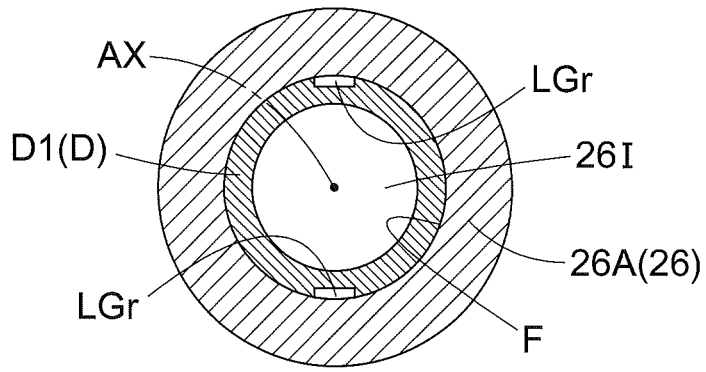
FIG. 14 is a cross-sectional view of a rotor shaft according to a different embodiment.
Figure 15:
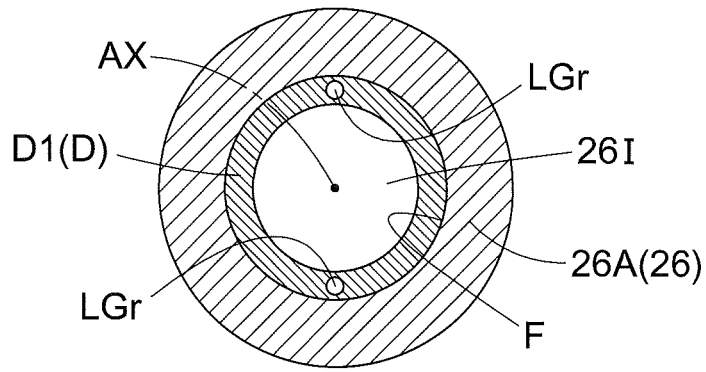
FIG. 15 is a cross-sectional view of a rotor shaft according to a different embodiment.
Figure 16:
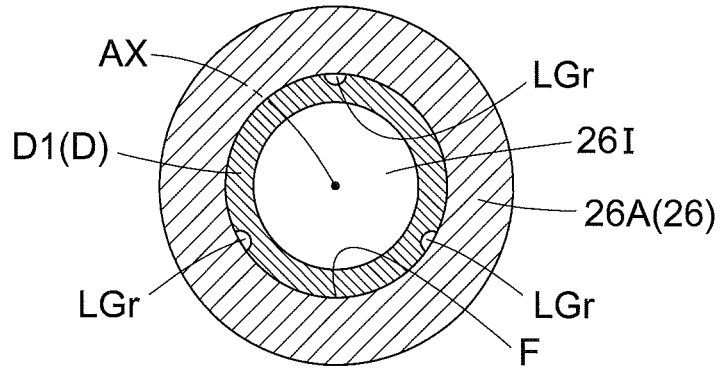
FIG. 16 is a cross-sectional view of a rotor shaft according to a different embodiment.

(4) In each of the embodiments described above, the axial communication paths LGr are provided in the inner peripheral surface F of the second rotor shaft 26 to be dented radially outward and extend in the axial direction L. However, the present disclosure is not limited to such a configuration. For example, as illustrated in FIGS. 12 to 16, the axial communication paths LGr may be provided in the weir portion (first weir portion D1). In this case, the axial communication paths LGr are preferably formed in a groove shape or a hole shape so as to pass through the weir portion D (first weir portion D1) in the axial direction L. FIGS. 13 to 16 are each a cross-sectional view of the second rotor shaft 26 taken along a plane that is orthogonal to the axial direction L. For example, as illustrated in FIGS. 12 and 13, the axial communication paths LGr may be provided in the outer peripheral surface of the weir portion D (first weir portion D1) to be dented radially inward and formed in a groove shape so as to extend in the axial direction L. In the illustrated example, the axial communication paths LGr are formed in a groove shape having an arcuate cross section that opens radially outward as viewed in the axial direction L. As illustrated in FIG. 14, the axial communication paths LGr may be formed in a groove shape having a rectangular cross section that opens radially outward as viewed in the axial direction L. Alternatively, as illustrated in FIG. 15, the axial communication paths LGr may be formed in a through hole shape that passes through a middle portion, in the radial direction, of the weir portion D (first weir portion D1). In the illustrated example, the axial communication paths LGr are formed in a hole shape having a circular cross section as viewed in the axial direction L. The cross-sectional shape of the axial communication paths LGr in a through hole shape is not limited thereto, and may be a variety of shapes (not illustrated) such as various polygonal shapes (such as a triangular shape and a rectangular shape) and an elliptical shape. FIGS. 13 to 15 each illustrate a configuration in which two axial communication paths LGr are provided in the weir portion D (first weir portion D1) at intervals in the circumferential direction. However, the present disclosure is not limited to such a configuration. As illustrated in FIG. 16, three or more axial communication paths LGr may be provided in the weir portion (first weir portion D1) at intervals in the circumferential direction. Alternatively, only one axial communication path LGr may be provided in the weir portion D (first weir portion D1) (not illustrated).

(5) In each of the embodiments described above, the portion to be lubricated H is the bearing B (first bearing B1) which rotatably supports the second rotor shaft 26. However, the present disclosure is not limited to such a configuration. The portion to be lubricated H may be a variety of portions to be lubricated in the vehicle drive device. Preferably, the portion to be lubricated H is a portion at which members slide against each other, such as a meshing portion of a gear mechanism or a bearing, for example.

(6) In each of the embodiments described above, the second rotor shaft 26 includes both the first weir portion D1 and the second weir portion D2. However, the present disclosure is not limited to such a configuration. It is only necessary that the second rotor shaft 26 should include at least the first weir portion D1.

(7) The configuration disclosed in each of the embodiments discussed above may be applied in combination with a configuration disclosed in any other embodiment unless any contradiction occurs. Also regarding the other configurations, the embodiment disclosed herein is merely illustrative in all respects. Thus, a variety of alterations can be made, as appropriate, without departing from the scope and spirit of the present disclosure.

4. Overview of Above Embodiments

The overview of the rotor for a rotary electric machine described above and the vehicle drive device including the rotor for a rotary electric machine will be described below.

A rotor (24) for a rotary electric machine includes: a rotor core (24A); a rotor shaft (26) having a tubular shape, passing through a radially inner side of the rotor core (24A) to be coupled to the rotor core (24A) and extending along an axial direction (L); an oil supply portion (S) that supplies oil to the rotor shaft (26); a portion to be lubricated (H) disposed on a first axial side (L1) with respect to the rotor core (24A) when one side in the axial direction (L) is defined as the first axial side (L1) and the other side in the axial direction (L) is defined as a second axial side (L2); and a lubrication oil path (75) through which oil is supplied to the portion to be lubricated (H). The rotor shaft (26) includes an inner peripheral portion (26I) surrounded by an inner peripheral surface (F) of the tubular shape, a radial oil path (72) that has an opening portion (72A) that opens in the inner peripheral surface (F) and that extends along a radial direction, an annular weir portion (D) disposed on the first axial side (L1) with respect to the opening portion (72A) and disposed so as to project radially inward from the inner peripheral surface (F) and extend in a circumferential direction along the inner peripheral surface (F), and an axial communication path (LGr). The oil supply portion (S) supplies oil to a portion of the inner peripheral portion (26I) on the second axial side (L2) with respect to the weir portion (D); the lubrication oil path (75) is disposed on the first axial side (L1) with respect to the weir portion (D) The axial communication path (LGr) is provided in the inner peripheral surface (F) or the weir portion (D) to communicate between a portion of the inner peripheral portion (26I) on the first axial side (L1) with respect to the weir portion (D) and the portion of the inner peripheral portion (26I) on the second axial side (L2) with respect to the weir portion (D) and communicate with the lubrication oil path (75).

With the present configuration, oil supplied to the inner peripheral portion (26I) of the rotor shaft (26) can be kept in the inner peripheral portion (26I) by the weir portion (D). Therefore, it is possible to appropriately supply oil to the radial oil path (72) via the opening portion (72A) which opens in the inner peripheral surface (F) of the rotor shaft (26), and to appropriately cool the rotor core (24A) which is disposed on the radially outer side of the rotor shaft (26). With the present configuration, in addition, oil can be supplied from a region of the inner peripheral portion (26I) on the second axial side (L2) with respect to the weir portion (D) to the lubrication oil path (75) on the first axial side (L1) with respect to the weir portion (D) through the axial communication path (LGr) which communicates between the portion of the inner peripheral portion (26I) on the first axial side (L1) with respect to the weir portion (D) and the portion thereof on the second axial side (L2) with respect to the weir portion (D). Thus, it is possible to appropriately supply oil also to the portion to be lubricated (H) which is disposed on the first axial side (L1) with respect to the rotor core (24A), and to appropriately lubricate the portion to be lubricated (H).

The portion to be lubricated (H) may be a bearing (B) that rotatably supports the rotor shaft (26).

With the present configuration, the bearing (B) which supports the rotor shaft (26) can be lubricated appropriately by oil supplied to the lubrication oil path (75).

An end portion of the axial communication path (LGr) on the second axial side (L2) may be disposed on the second axial side (L2) with respect to the opening portion (72A).

With the present configuration, oil on the second axial side (L2) with respect to the opening portion (72A) can be easily supplied to the axial communication path (LGr). Thus, the portion to be lubricated (H) can be lubricated appropriately by supplying oil to the axial communication path (LGr) even in the case where the amount of oil supplied to the inner peripheral portion (26I) is small.

The axial communication path (LGr) and the opening portion (72A) may be at different positions in the circumferential direction at the same position in the axial direction (L).

With the present configuration, oil that flows through the axial communication path (LGr) does not flow to the radial oil path (72) via the opening portion (72A). Thus, oil can be divided into oil that flows through the axial communication path (LGr) and oil that flows through the radial oil path (72). Hence, it is possible to both supply oil to the radial oil path (72) via the opening portion (72A) and supply oil to the lubrication oil path (75) via the axial communication path (LGr) appropriately.

The axial communication path (LGr) may be provided in the inner peripheral surface (F) to be dented radially outward, and formed so as to extend in the axial direction (L) through a radially outer side with respect to the weir portion (D).

With the present configuration, the axial communication path (LGr) can appropriately communicate between a portion of the inner peripheral portion (26I) on the first axial side (L1) with respect to the weir portion (D) and a portion thereof on the second axial side (L2) with respect to the weir portion (D). Thus, oil can be supplied from a region of the inner peripheral portion (26I) on the second axial side (L2) with respect to the weir portion (D) to the lubrication oil path (75) on the first axial side (L1) with respect to the weir portion (D).

The rotor (24) for a rotary electric machine may further include a circumferential groove (CGr) provided in the inner peripheral surface (F) to extend in the circumferential direction; and the circumferential groove (CGr) may be disposed on the second axial side (L2) with respect to the opening portion (72A), and connected to the axial communication path (LGr).

With the present configuration, oil on the second axial side (L2) with respect to the opening portion (72A) can be easily supplied to the axial communication path (LGr). Thus, the portion to be lubricated (H) can be lubricated appropriately by supplying oil to the axial communication path (LGr) even in the case where the amount of oil supplied to the inner peripheral portion (26I) is small.

A plurality of the axial communication paths (LGr) may be disposed side by side in the circumferential direction of the inner peripheral surface (F); and the circumferential groove (CGr) may be connected to at least two of the axial communication paths (LGr).

With the present configuration, oil on the second axial side (L2) with respect to the opening portion (72A) can be supplied to the axial communication path (LGr) further easily. Thus, the portion to be lubricated (H) can be lubricated appropriately by supplying a sufficient amount of oil to the axial communication path (LGr) even in the case where the amount of oil supplied to the inner peripheral portion (26I) is small.

The axial communication path (LGr) may be formed so as to pass through the weir portion (D) in the axial direction (L).

With the present configuration, the axial communication path (LGr) can appropriately communicate between a portion of the inner peripheral portion (26I) on the first axial side (L1) with respect to the weir portion (D) and a portion thereof on the second axial side (L2) with respect to the weir portion (D). Thus, oil can be supplied from a region of the inner peripheral portion (26I) on the second axial side (L2) with respect to the weir portion (D) to the lubrication oil path (75) on the first axial side (L1) with respect to the weir portion (D).

The oil supply portion (S) may include a first supply portion (Si) and a second supply portion (S2); the first supply portion (S1) may supply oil to the inner peripheral portion (26I) from an end portion of the rotor shaft (26) on the first axial side (L1); and the second supply portion (S2) may supply oil to the inner peripheral portion (26I) from an end portion of the rotor shaft (26) on the second axial side (L2).

With the present configuration, oil can be easily supplied to the inner peripheral portion (26I) more appropriately. Moreover, the state of supply of oil to the inner peripheral portion (26I) can be made different in accordance with the state of operation of the rotary electric machine etc. when the first supply portion (Si) and the second supply portion (S2) are connected to separate hydraulic circuits.

The weir portion (D) may be a first weir portion (D1); and an annular second weir portion (D2) disposed on the second axial side (L2) with respect to the opening portion (72A) and disposed so as to project radially inward from the inner peripheral surface (F) and extend in the circumferential direction along the inner peripheral surface (F) may be further provided.

With the present configuration, oil can be appropriately reserved in the inner peripheral portion (26I). Thus, it is possible to both supply oil to the radial oil path (72) and supply oil to the lubrication oil path (75).

A vehicle drive device (1) may include a rotary electric machine (MG2) that includes the rotor (24) for a rotary electric machine configured as described above, and an oil pump (OP) that supplies oil to the oil supply portion (S); and the oil pump (OP) includes a first oil pump (OP1) drivably coupled to the rotor shaft (26) to be driven by rotation of the rotor shaft (26).

With the present configuration, oil is supplied to the oil supply portion (S) through rotation of the rotor shaft (26). Therefore, with the present configuration, oil that serves as lubricating oil can be appropriately supplied to the portion to be lubricated (H) which needs to be lubricated by oil along with rotation of the rotor shaft (26). Thus, in the case where the vehicle travels with the wheels (W) rotating using the rotary electric machine (MG2) as a power source, the oil pump (OP) can be driven during the travel to supply oil to the inner peripheral portion (26I).

In the vehicle drive device (1) configured as described above, an internal combustion engine (EG) and the rotary electric machine (MG2) may be provided as drive force sources for wheels (W); and the oil pump (OP) may include a second oil pump (OP2) drivably coupled to the internal combustion engine (EG) to be driven by drive of the internal combustion engine (EG).

With the present configuration, in the case where the vehicle travels with the wheels (W) rotating using at least the internal combustion engine (EG) as a power source, the second oil pump (OP2) can be driven, and oil can be supplied to the inner peripheral portion (26I) by the second oil pump (OP2). In the case where the rotor shaft (26) is configured to rotate while the vehicle is traveling using the internal combustion engine (EG) as a power source, both the first oil pump (OP1) and the second oil pump (OP2) can be driven to increase the amount of oil supplied to the inner peripheral portion (26I) in the case where the vehicle travels using at least the internal combustion engine (EG) as a power source as described above.

The technology according to the present disclosure can be utilized for a rotor for a rotary electric machine and a vehicle drive device that includes the rotor for a rotary electric machine.

What is claimed is:

1. A rotor for a rotary electric machine, the rotor comprising:
   a rotor core;
   a rotor shaft having a tubular shape, passing through a radially inner side of the rotor core to be coupled to the rotor core, and extending along an axial direction;
   an oil supply path that supplies oil to the rotor shaft,
   a portion to be lubricated that is disposed on a first axial side with respect to the rotor core, wherein one side in the axial direction is defined as the first axial side and another side in the axial direction is defined as a second axial side; and
   a lubrication oil path through which oil is supplied to the portion to be lubricated, wherein:
   the rotor shaft includes:
      an inner peripheral portion surrounded by an inner peripheral surface of the tubular shape,
      a radial oil path that has an opening that opens in the inner peripheral surface and that extends along a radial direction,
      an annular weir disposed on the first axial side with respect to the opening and disposed so as to project radially inward from the inner peripheral surface and extend in a circumferential direction along the inner peripheral surface, and
      an axial communication path;
   the oil supply path supplies oil to a portion of the inner peripheral portion on the second axial side with respect to the weir;
   the lubrication oil path is disposed on the first axial side with respect to the weir; and
   the axial communication path is provided in the inner peripheral surface or the weir to communicate between a portion of the inner peripheral portion on the first axial side with respect to the weir and the portion of the inner peripheral portion on the second axial side with respect to the weir and communicate with the lubrication oil path.

2. The rotor for a rotary electric machine according to claim 1, wherein
   the portion to be lubricated is a bearing that rotatably supports the rotor shaft.

3. The rotor for a rotary electric machine according to claim 2, wherein
   an end of the axial communication path on the second axial side is disposed on the second axial side with respect to the opening.

4. The rotor for a rotary electric machine according to claim 3, wherein
   the axial communication path and the opening are at different positions in the circumferential direction at the same position in the axial direction.

5. The rotor for a rotary electric machine according to claim 4, wherein
   the axial communication path is provided in the inner peripheral surface to be dented radially outward, and formed so as to extend in the axial direction through a radially outer side with respect to the weir.

6. The rotor for a rotary electric machine according to claim 5, further comprising a circumferential groove provided in the inner peripheral surface to extend in the circumferential direction, wherein
   the circumferential groove is disposed on the second axial side with respect to the opening, and connected to the axial communication path.

7. The rotor for a rotary electric machine according to claim 6, wherein:
   a plurality of the axial communication paths are disposed side by side in the circumferential direction of the inner peripheral surface; and
   the circumferential groove is connected to at least two of the axial communication paths.

8. The rotor for a rotary electric machine according to claim 7, wherein:
   the oil supply path includes a first supply path and a second supply path;
   the first supply path supplies oil to the inner peripheral portion from an end of the rotor shaft on the first axial side; and
   the second supply path supplies oil to the inner peripheral portion from an end of the rotor shaft on the second axial side.

9. The rotor for a rotary electric machine according to claim 8, wherein:
   the weir is a first weir; and
   an annular second weir disposed on the second axial side with respect to the opening and disposed so as to project radially inward from the inner peripheral surface and extend in the circumferential direction along the inner peripheral surface is further provided.

10. The rotor for a rotary electric machine according to claim 1, wherein
    an end of the axial communication path on the second axial side is disposed on the second axial side with respect to the opening.

11. The rotor for a rotary electric machine according to claim 1, wherein
    the axial communication path is provided in the inner peripheral surface to be dented radially outward, and formed so as to extend in the axial direction through a radially outer side with respect to the weir.

12. The rotor for a rotary electric machine according to claim 1, wherein
    the axial communication path is formed so as to pass through the weir in the axial direction.

13. The rotor for a rotary electric machine according to claim 1, wherein:
    the oil supply path includes a first supply path and a second supply path;
    the first supply path supplies oil to the inner peripheral portion from an end of the rotor shaft on the first axial side; and
    the second supply path supplies oil to the inner peripheral portion from an end of the rotor shaft on the second axial side.

14. The rotor for a rotary electric machine according to claim 1, wherein:
    the weir is a first weir; and
    an annular second weir disposed on the second axial side with respect to the opening and disposed so as to project radially inward from the inner peripheral surface and extend in the circumferential direction along the inner peripheral surface is further provided.

15. A vehicle drive device comprising:
    a rotary electric machine that includes the rotor for a rotary electric machine according to claim 1; and
    an oil pump that supplies oil to the oil supply path, wherein
    the oil pump includes a first oil pump drivably coupled to the rotor shaft to be driven by rotation of the rotor shaft.

16. The vehicle drive device according to claim 15, wherein:
- an internal combustion engine and the rotary electric machine are provided as drive force sources for wheels; and
- the oil pump includes a second oil pump drivably coupled to the internal combustion engine to be driven by a drive force of the internal combustion engine.

* * * * *